US010735546B2

(12) United States Patent
Balazinski et al.

(10) Patent No.: US 10,735,546 B2
(45) Date of Patent: Aug. 4, 2020

(54) DASH CACHING PROXY APPLICATION

(71) Applicant: Vid Scale, Inc., Wilmington, DE (US)

(72) Inventors: Bartosz Balazinski, Montreal (CA); Jun Li, Cranbury, NJ (US); Debashish Purkayastha, Collegeville, PA (US)

(73) Assignee: VID SCALE, Inc., Wilmington, DE (US)

(*) Notice: Subject to any disclaimer, the term of this patent is extended or adjusted under 35 U.S.C. 154(b) by 156 days.

(21) Appl. No.: 15/737,100

(22) PCT Filed: Jun. 29, 2016

(86) PCT No.: PCT/US2016/040085
§ 371 (c)(1),
(2) Date: Dec. 15, 2017

(87) PCT Pub. No.: WO2017/004196
PCT Pub. Date: Jan. 5, 2017

(65) Prior Publication Data
US 2018/0367637 A1 Dec. 20, 2018

Related U.S. Application Data

(60) Provisional application No. 62/186,281, filed on Jun. 29, 2015.

(51) Int. Cl.
H04L 29/08 (2006.01)
H04L 29/06 (2006.01)
(Continued)

(52) U.S. Cl.
CPC ...... H04L 67/2842 (2013.01); H04L 65/4084 (2013.01); H04L 65/608 (2013.01);
(Continued)

(58) Field of Classification Search
None
See application file for complete search history.

(56) References Cited

U.S. PATENT DOCUMENTS 8,806,050 B2 8/2014 Chen et al.
9,246,842 B2 1/2016 Oyman et al.
(Continued)

FOREIGN PATENT DOCUMENTS

CN 103299595 A 9/2013
GB 2481529 A 12/2011
WO WO 2011/139305 A1 11/2011

OTHER PUBLICATIONS

3rd Generation Partnership Project (3GPP), S4-130924, "IS-DASH: Consolidated Use Cases on Server and Network-assisted DASH", Qualcomm Incorporated, 3GPP TSG-SA4 #75, Vancouver, Canada, Sep. 23-27, 2013, 10 pages.
(Continued)

Primary Examiner — Esther B. Henderson
(74) Attorney, Agent, or Firm — Condo Roccia Koptiw LLP

(57) ABSTRACT

Systems, methods, and instrumentalities are disclosed for media caching proxy techniques (e.g., applications) that enable caching of multimedia content delivered, for example, using the Dynamic Adaptive Streaming over HTTP (DASH) protocol. A request may be received from a client for a media presentation description (MPD) file relating to media content. The media content may comprise a plurality of media segments. An MPD file may be received from cache. A subset of the plurality of media segments of the media content stored within the cache may be determined. An available bandwidth on a backhaul link may be determined. A dynamic MPD file may be generated based on the MPD file, the subset of the plurality of media segments of the media content that is stored within the cache of the
(Continued)

middle box platform, and/or the available bandwidth on the backhaul link. The dynamic MPD file may be transmitted to the client.

20 Claims, 15 Drawing Sheets

(51) Int. Cl.
 *H04N 21/643* (2011.01)
 *H04N 21/231* (2011.01)
 *H04N 21/24* (2011.01)
(52) U.S. Cl.
 CPC ....... *H04L 67/02* (2013.01); *H04N 21/23106* (2013.01); *H04N 21/2402* (2013.01); *H04N 21/64322* (2013.01)

(56) References Cited

U.S. PATENT DOCUMENTS

| | | | |
|---|---|---|---|
| 2011/0099594 A1* | 4/2011 | Chen | H04N 21/23439 725/105 |
| 2011/0238789 A1 | 9/2011 | Luby et al. | |
| 2013/0042013 A1 | 2/2013 | Bouazizi | |
| 2013/0182643 A1* | 7/2013 | Pazos | H04L 65/4076 370/328 |
| 2014/0219230 A1 | 8/2014 | Schierl et al. | |
| 2015/0006621 A1 | 1/2015 | Westphal | |

OTHER PUBLICATIONS

Dash Industry Forum, "Dash Reference", Available at http://dashif.org, 2012-2016, 2 pages.
ETSI, "Mobile-Edge Computing", Introductory Technical White Paper, No. 1, Sep. 2014, 36 pages.
IETF, "SPUD-Session Protocol Underneath Datagrams", Available at https://www.ietf.org/mailman/listinfo/spud, retrieved on Dec. 15, 2017, 2 pages.
Internet Architecture Board, "IAB Workshop on Stack Evolution in a Middlebox Internet (SEMI) 2015", Available at https://www.iab.org/activities/workshops/semi/, ETH Zürich, Switzerland, Jan. 26-27, 2015, 4 pages.
ISO/IEC, "Information Technology-Dynamic Adaptive Streaming over HTTP (DASH)—Part 1: Media Presentation Description and Segment Formats", ISO/IEC 23009-1:2014, 2nd Edition, May 2014, 152 pages.

* cited by examiner

DASH CACHING PROXY APPLICATION

CROSS REFERENCE

This application is the National Stage Entry under 35 U.S.C. § 371 of Patent Cooperation Treaty Application No. PCT/US2016/040085, filed Jun. 29, 2016, which claims the benefit of U.S. Provisional Application No. 62/186,281, filed on Jun. 29, 2015, which is incorporated herein by reference as if fully set forth.

BACKGROUND

A network with competing client applications (e.g., media players) may lead to instability and unfairness between different sessions. Unfairness may be particularly noticeable, for example, when some clients are subject to greater network delays than other clients. A DASH protocol, among other media delivery protocols, may not be well-suited to environments with variable download conditions. For example, a streaming client (e.g., a DASH client) may request segments of media content based on the throughput it experiences. However, a caching middle box may reside between the streaming client and an origin server, such that some but not all segments are stored at the caching device. The caching device may be connected to the origin server via a backhaul link. If the backhaul link and/or the origin server has lower throughput than the connection between the client and caching device, the streaming client may not be able to accurately determine the throughput back to the origin server when the caching device is present. This may result in an unintended decrease in the quality of experience (QoE).

SUMMARY

Systems, methods and instrumentalities are disclosed for media caching proxy techniques (e.g., via a caching proxy application) associated with caching of multimedia content that is delivered, for example, using the Dynamic Adaptive Streaming over HTTP (DASH) protocol. Determination and communication of media segment availability may be performed by a caching entity (e.g., a DASH caching proxy application associated with a caching device such as a DASH cache). Such management may be based on cache content (e.g. knowledge of what content is currently present in the cache) and/or backhaul link congestion levels. Management may comprise considering the availability of cached segments, considering the load on a backhaul link, and in response, modifying the content of a media manifest (e.g., a DASH Media presentation Description (MPD) file). For example, the media manifest may be modified to communicate the content representations (e.g. media segments at different bitrates or resolutions) which are currently available via the cache and/or which are available from a content server via the backhaul. This may be performed periodically, e.g., to take into account changing conditions on the backhaul link and/or segment availability on the cache. A client may periodically request the media manifest, which may result in the client having up to date information about segment availability. For example, the client may perform such refreshing of the media manifest after each segment download. The client refreshing the media manifest may prevent the client from selecting media resolutions that decrease a quality of experience and/or cause congestion on a backhaul link. The disclosed features may be applicable to Mobile Edge Computing (MEC) and other environments. Examples are provided for a DASH caching proxy application.

Systems, methods, and instrumentalities are disclosed for media caching proxy techniques (e.g., applications) that enable caching of multimedia content delivered, for example, using the Dynamic Adaptive Streaming over HTTP (DASH) protocol. A request may be received from a client for a media presentation description (MPD) file relating to media content. The media content may comprise a plurality of media segments. An MPD file may be retrieved and/or received from cache. The cache may include one or more cache units that may reside on one or more memories and/or disks. One or more cache units may reside on a single device, and/or one or more cache units may reside on multiple devices. For example, an MPD file may be stored in an "MPD cache" and/or media segments may be stored in a "media cache." The MPD cache and the media cache may reside within the same cache memory (e.g., physical cache memory) and/or the MPD cache and the media cache may reside within different cache memories (e.g., within different memories within the same device and/or on different devices).

The cache may be part of a middle box platform and/or the cache may be part of a device that is different than the middle box platform. For example, the MPD file may be retrieved and/or received from the middle box platform, and/or the MPD file may be retrieved and/or received from a device that is different than the middle box platform. A device (e.g., the middle box platform) may retrieve and/or receive the MPD file from memory of the middle box platform and/or a device (e.g., a middle box platform) may retrieve and/or receive the MPD file from a device that is different than the middle box platform.

A subset of the plurality of media segments of the media content stored within the cache may be determined. An available bandwidth on a backhaul link may be determined. A dynamic MPD file may be generated based on the MPD file, the subset of the plurality of media segments of the media content that is stored within the cache of the middle box platform, and/or the available bandwidth on the backhaul link. The dynamic MPD file may be transmitted to the client.

DETAILED DESCRIPTION

Figure 1:
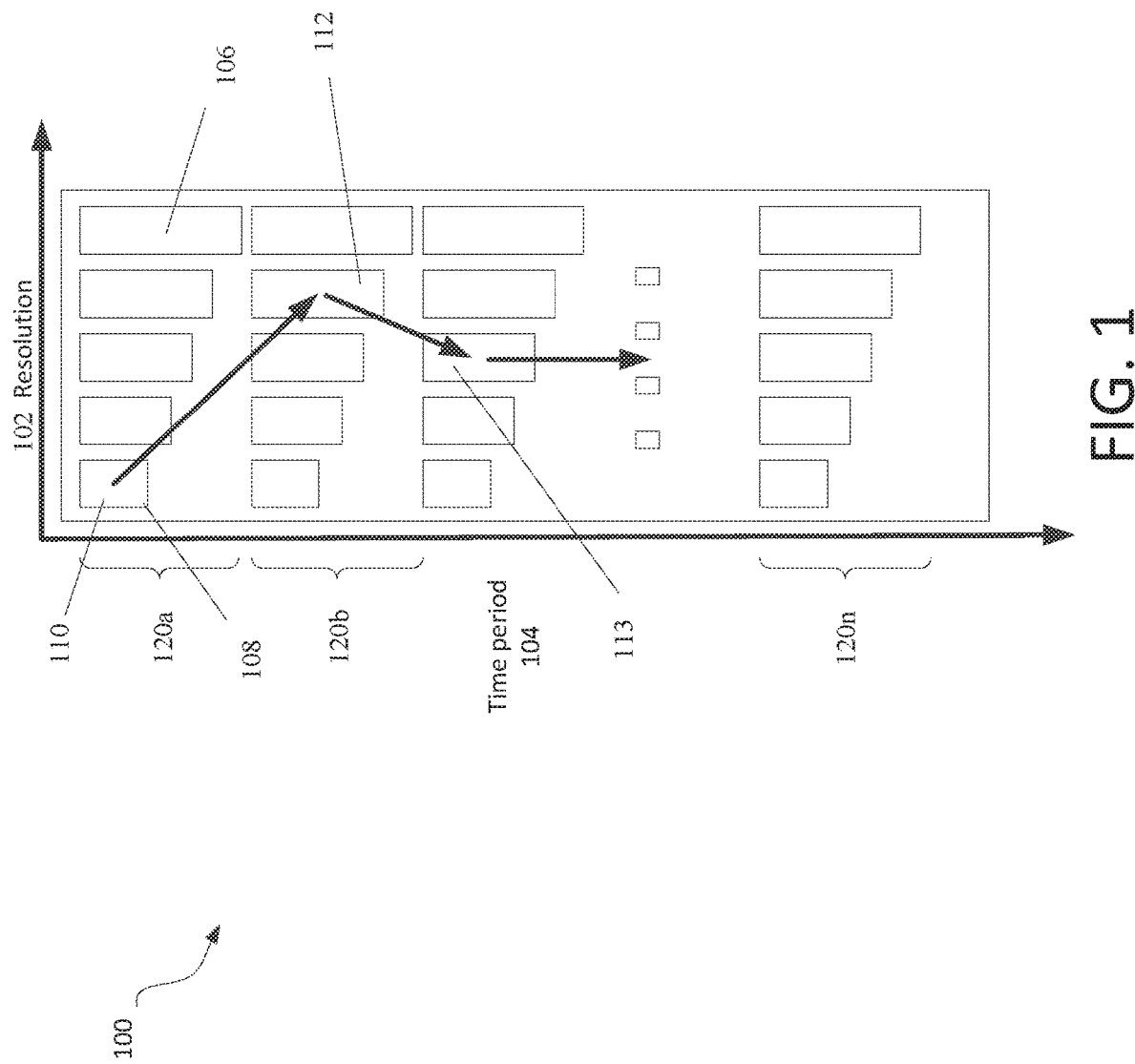
FIG. 1 shows an example of Dynamic Adaptive Streaming over HTTP (DASH) protocol operation.

A detailed description of illustrative embodiments will now be described with reference to the various figures. Although this description provides a detailed example of possible implementations, it should be noted that the details are intended to be exemplary and in no way limit the scope of the application.

Systems, methods, and instrumentalities are disclosed for media caching proxy techniques (e.g., applications) that enable caching of multimedia content delivered. For example, systems, methods, and instrumentalities are disclosed for media caching proxy techniques that enable caching of multimedia content delivered using the Dynamic Adaptive Streaming over HTTP (DASH) protocol. Availability and/or delivery throughput of media segments to clients may be managed. Media segments may include segments of media content. For example, availability and/or delivery throughput of media segments to clients may be managed based on cache content and/or backhaul link congestion levels. Management may comprise considering the availability of cached segments and/or considering the load on a backhaul link and modifying the content of a media manifest (e.g., a DASH Media presentation Description (MPD) file). The load on a backhaul link may include throughput and/or a number of sessions, for example. The load on a backhaul link may be used to determine the capacity to download media segments from the origin server. Management may include considering the load on a backhaul link and/or modifying the content of a media manifest to prevent a client from selecting media resolutions that may decrease a quality of experience and/or cause congestion on a backhaul link. Techniques may be applicable to Mobile Edge Computing (MEC) and/or other environments. Examples may be provided for an MEC DASH caching proxy application.

The DASH protocol may rely on Hyper Text Transfer Protocol (HTTP) to enable clients to download media content encoded at various rates and/or resolutions. For example, the DASH protocol may rely on Hyper Text Transfer Protocol (HTTP) to enable clients to download media content encoded at various rates and/or resolutions depending on prevailing and/or current network conditions. Media may be broken into one or more segments. Each segment may be encoded into one or more versions (e.g. different content representations). Each version of an encoded segment may represent a segment encoded at rates (e.g., different rates) and/or resolutions (e.g. different resolutions) for the same media content time periods. Versions (e.g., various versions) of a segment may have sizes (e.g., different sizes). For example, a segment version size may be proportional to encoded resolution, for example, where higher resolution may lead to larger size. Versions (e.g., various versions) of a segment may utilize amounts (e.g., different amounts) of resources, such as storage and/or communication (e.g., download) throughput.

A client (e.g., an application running on a client) may select (e.g., select for downloading) a segment version (e.g., a representation of a segment) that may be appropriate (e.g., the most appropriate) size based on one or more factors. For example, factors may include user experience, previously downloaded segment versions, and/or estimated available throughput (e.g., as measured by the client). A client may select a segment (e.g., the next segment). For example, a client may select the next segment by matching bandwidth for a segment with estimated (e.g., approximate) bandwidth (e.g., available bandwidth). Available bandwidth may be determined. For example, available bandwidth may be determined by observing download parameters of current and/or previous segments.

A client may be informed about the availability and/or location of segments on one or more media servers. For example, a client may be informed about the availability and/or location of segments on one or more media servers by a media manifest file (e.g., a manifest). An example of a manifest is a Media Presentation Description (MPD) file. A manifest may provide an inventory of available segment versions (e.g., representations) and/or the names, locations, resolutions, bandwidths, etc., of the available segment versions. Manifests may be obtained by one or more techniques. For example, manifests may be obtained by using one or more communication techniques, such as File Transfer Protocol (FTP), e-mail, HTTP, etc. HTTP access may provide flexibility, Network Address Translation (NAT) firewall traversal, and/or widespread availability on servers and/or clients. Examples may be provided with MPD files accessed by HTTP, although techniques may be applicable to other manifests accessed by HTTP and/or other techniques.

FIG. 1 shows an example DASH protocol operation. As shown, media content may be divided into segments (e.g., multiple segments, such as n segments) and/or time periods. For example, media content may be divided into segments $120a$, $120b$, $120n$. Although not shown in the diagram, other properties of the content (e.g., bit rate and/or frame rate) may be used in place of, or in addition to, resolution. Each segment 1-n may comprise a time period 104 and/or a resolution 102 of the content. Each segment may be encoded at one or more (e.g., five) different resolutions. Resolutions of a segment may result in file sizes (e.g., different file sizes), which may be shown in FIG. 1. For example, as shown in FIG. 1, a size of a rectangle which represents a segment version may indicate the resolution of the segment version (e.g., as segment size increases, resolution may increase). For example, the size of high resolution segments 106 may be larger than the size of low resolution segments 108).

A client may begin by downloading a first segment (e.g., segment $120a$ and/or 110 within segment $120a$) encoded in a resolution 102 (e.g., the lowest resolution, such as the smallest file). The client may estimate download bandwidth (e.g., available download bandwidth) and/or determine that segments having a higher resolution than a segment (e.g., higher than segment version 110) may be downloaded. As indicated by the diagonal arrow from the first downloaded segment to the second downloaded segment, a client may select for download segment $120b$ (e.g., segment version 112 within segment $120b$) encoded at the fourth highest resolution available. The client may reduce resolution for the next segment (e.g., selecting segment version 113). For example, the client may reduce resolution for the next segment by determining that the client previously overestimated the available bandwidth. As indicated by the diagonal arrow from the second downloaded segment (e.g., segment version 112) to the third downloaded segment (e.g., segment version 113), a client may select for download a segment encoded at the third highest resolution available. The process of estimating available bandwidth and/or using available bandwidth to select segment representations for download may continue through the final segment (e.g., segment 120n) at the end of the media.

Figure 2:
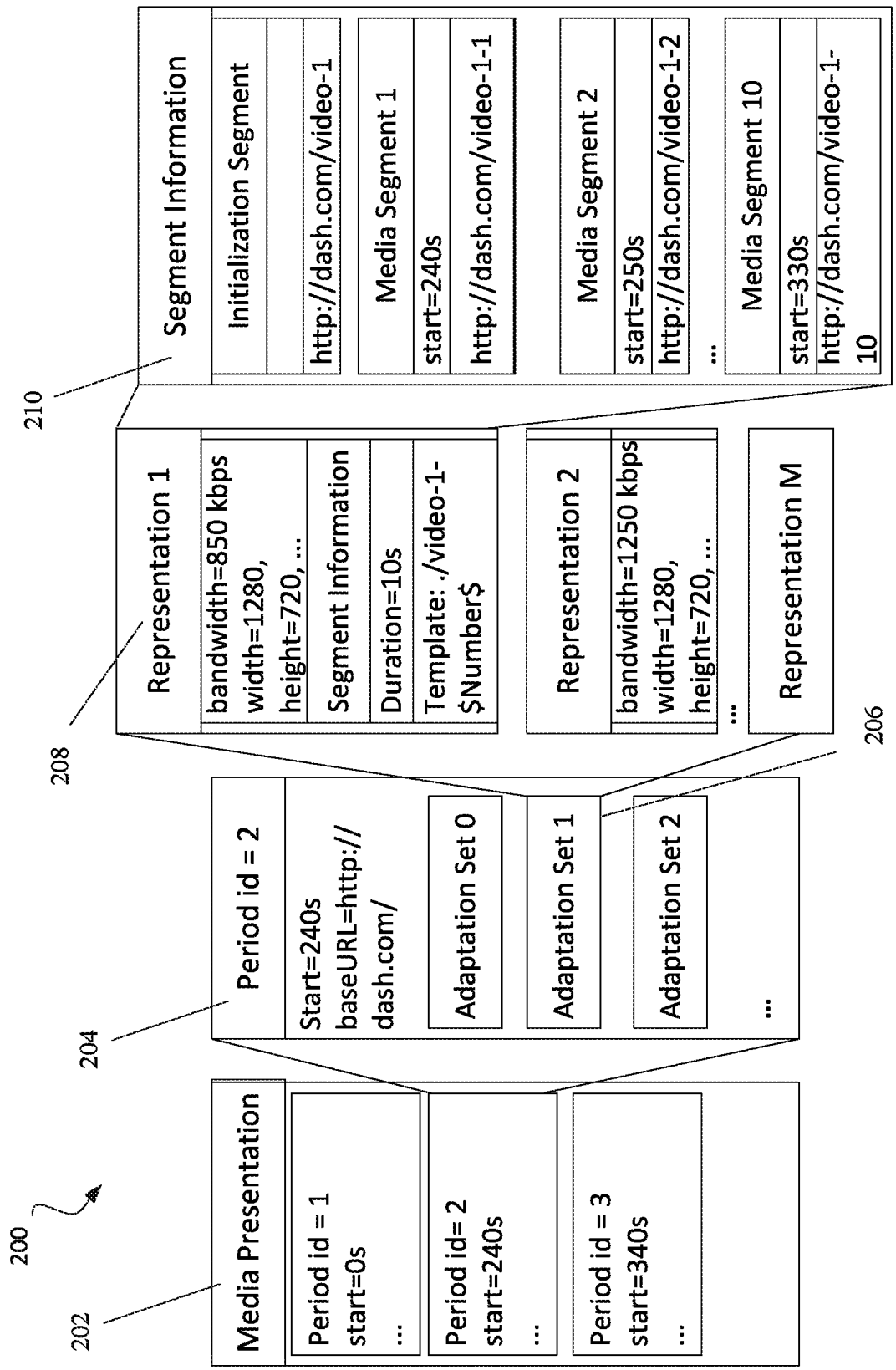
FIG. 2 shows an example structure of a manifest.

FIG. 2 shows an example structure of a manifest. The manifest may be an MPD file. The manifest may be specified in XML. For example, an MPD file may be specified in XML. A top level of an MPD file (e.g., an "MPD") may specify a Media Presentation Description (MPD) node 202. An MPD may be divided into one or more periods 204. A period 204 (e.g., each period) may cover all or a portion of the media. A period may be subdivided into Adaptation sets 206. An adaptation (e.g., each adaptation) set 206 may be associated with a media type, such as audio and/or video. An adaptation set 206 may comprise one or more (e.g., various) representations 208. A (e.g., each) representation 208 may correspond to a specific resolution and/or rate of encoding of a segment. A representation 208 may comprise a definition of a media segment, a reference to a container file, access address and/or location, etc. A representation element 208, alone and/or among other items or elements, may specify a bandwidth. For example, a representation element 208, alone and/or among other items or elements, may specify a bandwidth to playback a referenced media segment. Information 210 in an MPD, such as media segment representation bandwidth, may be a factor in selecting one or more media segment representations. For example, media segment representation bandwidth may be a factor in selecting one or more media segment representations.

An MPD node 202 may offer an ability to define a media type. As an example, a media type may be defined as static and/or dynamic. Static media may be a media that may not change over time. An MPD file for static media may be read during media download (e.g., once per media download). An example of static media may be a movie stored on a server in its original form. Dynamic media may be a media that may evolve over time. A dynamic media may have a duration and/or segment availability that may change. An MPD file for dynamic media may be updated during media download. For example, an MPD file for dynamic media may be updated during media download to adapt to evolving duration and/or segment availability. A frequency of MPD file updates may be specified in an MPD file. Live broadcasts may be an example of dynamic media.

Mobile Edge Computing (MEC) may provide information technology (IT) and/or cloud-computing capabilities to a Radio Access Network (RAN) with ultra-low latency, high bandwidth network access, and/or access to radio network information, which may be used by applications to offer context-related services. Application-aware performance optimization by MEC may improve network efficiency and/or enhance user/customer experience.

Figure 3:
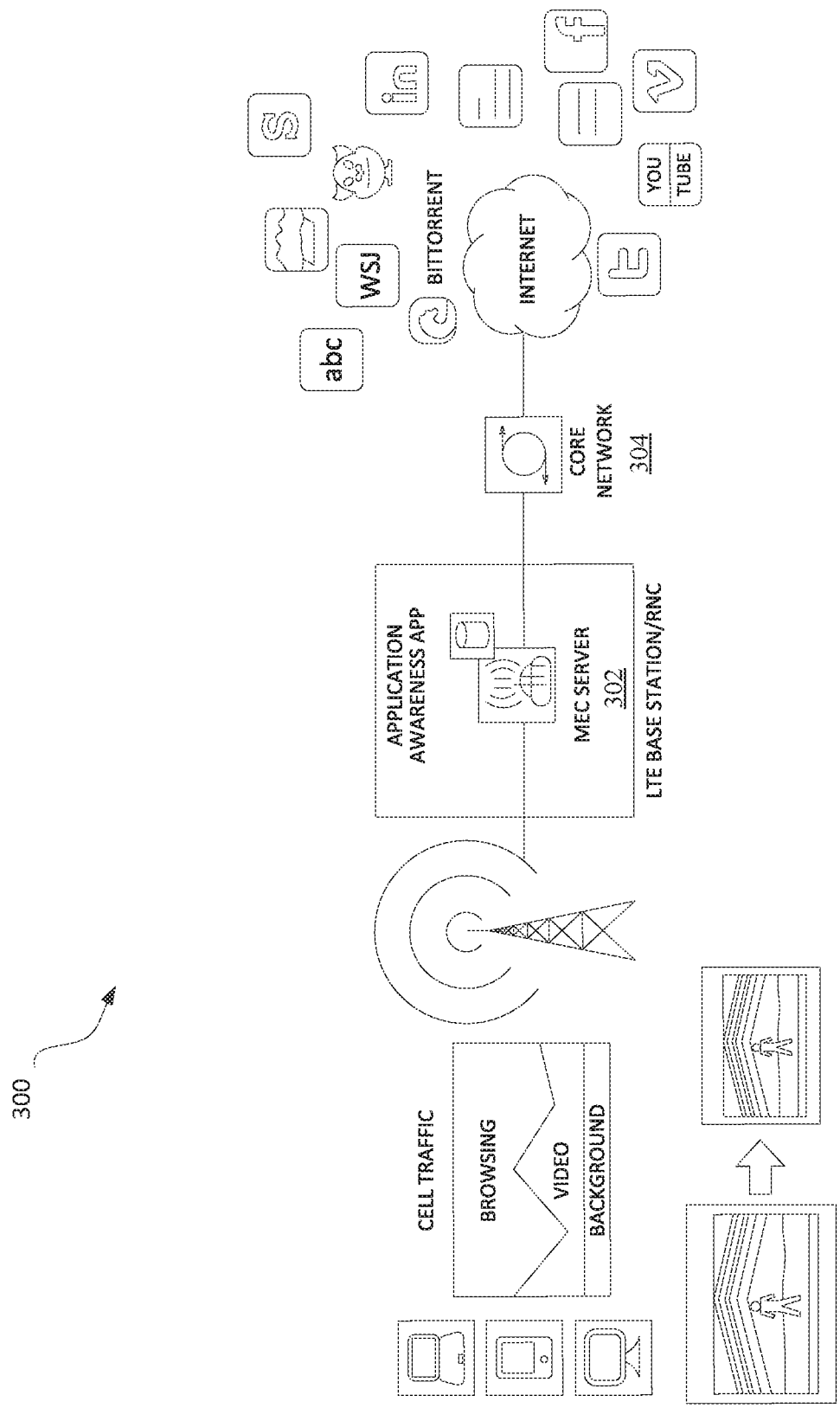
FIG. 3 shows an example of application-aware performance optimization.

FIG. 3 shows an example of application-aware performance optimization. MEC may define a platform that may offer one or more (e.g., various) services to hosted applications. An MEC platform may be placed at the "edge" of a network 304. An "edge" of a network may be in and/or proximate to an LTE macro base station (eNB) site, a multi-technology (3G/LTE) cell aggregation site, and/or a Radio Network Controller (RNC) site. An application aware MEC server at the "edge" of a RAN may permit enhanced performance applications, such as enhanced media streaming applications. For example, an application aware MEC server 302 in and/or proximate to an LTE base station may permit enhanced performance applications, such as enhanced media streaming applications.

A media content delivery deployment may utilize intermediate and/or middle box caching. For example, a media caching proxy technique (e.g., application) for DASH and/or other media content delivery protocol may be deployed. For example, a media caching proxy technique (e.g., application) for DASH and/or other media content delivery protocol may be deployed on an MEC platform placed near the edge of a RAN. A media caching proxy technique may be deployed and/or implemented in a variety of scenarios and/or locales. For example, media caching proxy technique may be deployed and/or implemented in a variety of scenarios and locales whether distributed and/or centralized, with or without DASH, and with and/or without MEC.

A media caching proxy may enhance user experience. For example, a media caching proxy may enhance user experience by improving and/or maximizing utilization of a high capacity RAN and/or caching media close to users. A media caching proxy may reduce the load and/or cost of shared backhaul. A media caching proxy may increase fairness between concurrent DASH sessions.

Media delivery protocols may or may not be adapted to provide optimal performance in environments with variable download conditions. For example, a DASH protocol may not be adapted to provide optimal performance in environments with variable download conditions. In a cached deployment environment, media segments may be stored (e.g., stored closer to users, for example, cached). For example, in a cached deployment environment, some media segments may be stored closer to users to provide access to media segments via a higher throughput path, while other segments may be stored remotely (e.g., in a remote origin server) accessible through a lower throughput path. Segment distribution among cached and/or remote storage may lead to media player download oscillation between high throughput and low throughput, which may result in player instability and/or low quality user experience.

A client-side (e.g., media player) enhancement against oscillation may probe the availability of a segment (e.g., the next segment) with an exponential back-off mechanism. A client may lack an accurate understanding of network conditions beyond the cache proxy to a media server (e.g., backhaul) and/or may or may not have information about the availability of media segments at the cache proxy.

Media file fragmentation may cause downloads to be sporadic, which may create an on/off pattern. A network with competing client applications (e.g., media players) may exacerbate the on/off pattern, which may lead to instability and/or unfairness between sessions (e.g., different sessions). Unfairness may be noticeable. For example, unfairness may be noticeable when one or more clients are subject to greater network delays than other clients. Unfairness may be traced. For example, unfairness may be traced to Transmission Control Protocol (TCP) sessions belonging to clients that may (e.g., due to delays and/or traffic generated by other clients) take more time during a slow start period and/or rarely (e.g., or never) reach a congestion avoidance transmission mode.

Client bandwidth availability measurements by clients with delays (e.g., longer delays) may indicate (e.g., systematically indicate) a lower bandwidth than may be available.

An indication (e.g., a false indication) of low bandwidth availability may lead a client subject to higher delays to systematically select lower resolution segments. For example, due to a lack of limitation in the selection of media segments for clients with lower delays, clients with lower delays may end up "stealing" bandwidth from clients subject to higher delays.

Figure 4:
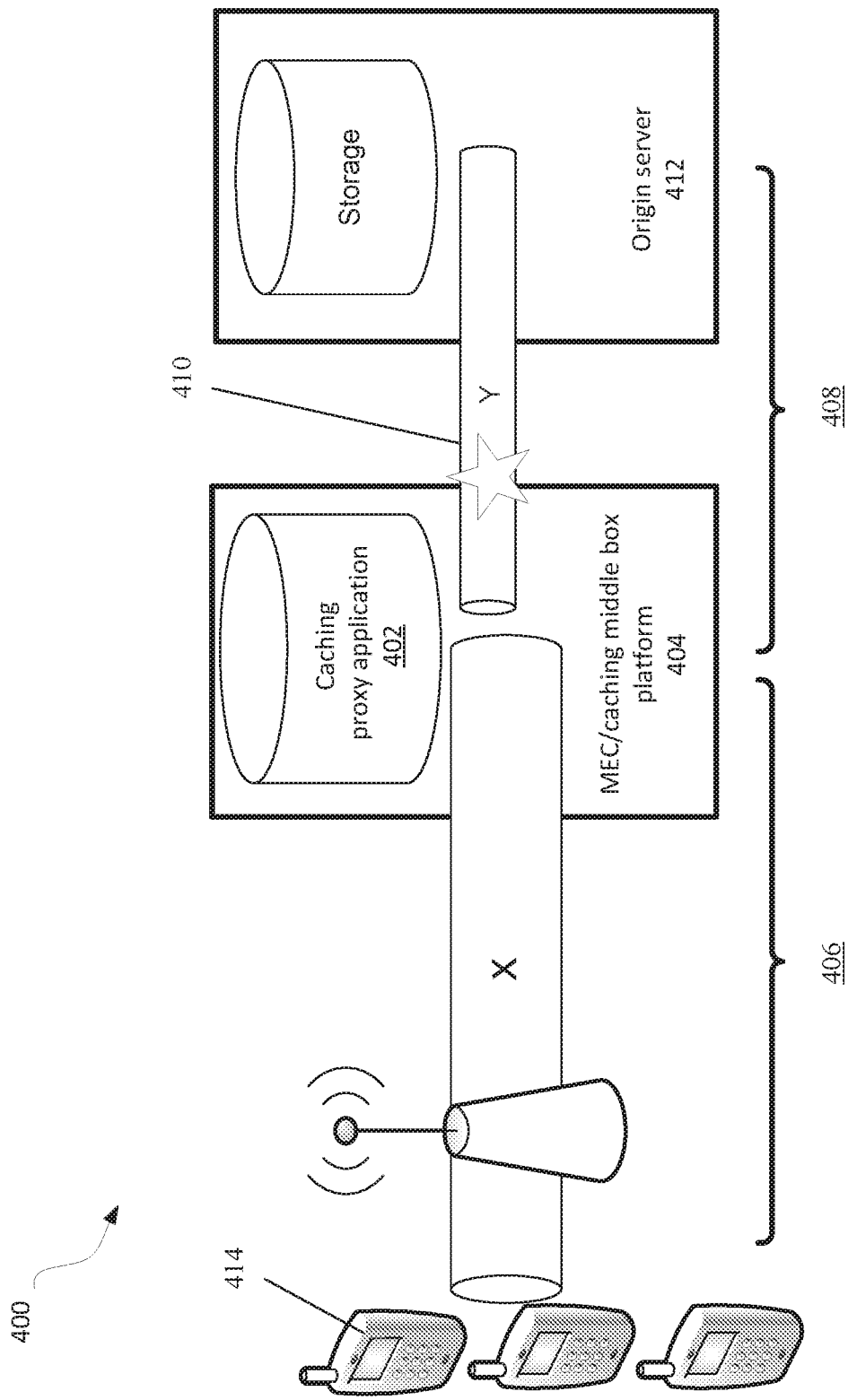
FIG. 4 shows an example of a media caching proxy technique for DASH or other media content delivery protocol.

FIG. 4 shows an example of a media caching proxy implementation 400. Features described herein may be implemented via a caching proxy. For example, features described herein may be implemented via the caching proxy via a cache server (e.g., via an application that may be located on the cache server). The caching proxy may be applicable for DASH and/or other media content delivery protocols. A caching proxy 402 (e.g., a DASH caching proxy, such as a DASH caching proxy application) may be deployed (e.g., positioned or placed) as an intermediate and/or middle box 404 between a radio access network (RAN) 406 (e.g., a high performance multi access network RAT), and a shared backhaul access network 408 (e.g., a limited shared backhaul access network). Backhaul may comprise the overhead of the Packet Core Network (PCN), which may have various servers related to the mobility and operation of a mobile network.

Backhaul network limitations may cause a bottleneck 410 in throughput and/or delay on a data path between a client 414 and/or an origin server 412. Network layout constraints may occur in Home NodeB networks and/or other home network deployments.

A caching proxy 402 (e.g., a DASH caching proxy) may determine and/or communicate the availability of media segments and/or delivery of the media segments. A caching proxy 402 may manage DASH requests issued by clients that may be unable to reliably estimate cache content and backhaul limitations.

Management (e.g., of DASH requests) may comprise taking into consideration the availability of cached segments, taking into account the load on the backhaul link, and/or modifying the content of a manifest (e.g., MPD file). The backhaul link may include a link (e.g., a communication link) between the core network and subnetworks at the edge of a hierarchical network. For example, the backhaul link may include a link (e.g., a communication link) between a middle box platform and an origin server. A manifest may be modified. For example, a manifest may be modified based on the availability of cached segments and/or the load on the backhaul link. A client may operate based on a modified MPD. For example, a client may operate based on a modified MPD, as opposed to an original (e.g., unmodified) MPD. The cache server may instruct the client to refresh (e.g., periodically refresh) its manifest. For example, the cache server may instruct the client to refresh its manifest after each received content portion (e.g., segment). The cache server may set an expiration time. The expiration time may be used to enforce a refresh period determined by the cache server. For example, the cache server may set an expiration time when the MPD file is modified. The expiration time may be set in the MPD file, and/or the expiration time may be set outside of the MPD file. The cache server may send an event on expiration of the expiration time. For example, the cache server may send an instruction to the client to refresh its manifest when the expiration time expires. After the expiration time expires and the cache server sends an instruction to the client to refresh its manifest, the client may refresh its manifest.

The cache server may instruct the client to refresh its manifest periodically. For example the cache server may instruct the client to refresh its manifest every T seconds and/or every M downloaded segments (e.g., where M>1). The cache server may determine a refresh period (e.g., T seconds) and/or M downloaded segments. For example, the cache server may determine a refresh period and/or M downloaded segments based on the frequency that new content segments are added to the cache. For example, the values of T and/or M may be larger if the cache content is stable, or the values of T and/or M may be smaller if the cache is frequently updated with new content segments. The cache server may determine refresh periods (e.g., T seconds) and/or M segments based on whether the throughput of the backhaul link is stable and/or whether the throughput of the backhaul link is frequently changing. For example, the values of T and/or M may be larger if the backhaul link throughput and/or load is judged to be stable or changes infrequently. The values of T and/or M may be smaller if the backhaul link throughput and/or load is judged to be more variable or is changing more quickly or unpredictably. The client may have up-to-date availability information (e.g. information about availability of cached content segments) based on refreshing the manifest as instructed.

A device, devices, and/or system implementing one or more caching proxy techniques may monitor one or more parameters (e.g., backhaul congestion and cache content) to give client(s) more accurate information to use in choosing segment representations. The device, devices, and/or system implementing one or more caching proxy techniques may make partial and/or whole decisions for client(s). For example, the device, devices, and/or system implementing one or more caching proxy techniques may make partial and/or whole decisions for client(s) by changing the list of segment representations (e.g., available segment representations) to choose from in a manifest, which may limit access and/or availability and/or may steer clients to one or more segment representations.

Caching proxy techniques may open and/or enhance media access and/or delivery protocols. For example, caching proxy techniques may open and/or enhance media access and/or delivery protocols to take advantage of caching devices such as middle boxes. Examples may be provided from a DASH caching proxy perspective that may take advantage of an MEC platform and middle box caching proxy, although caching proxy techniques may be applicable to other scenarios and implementations.

Caching proxy techniques may be used alone and/or in conjunction with client and/or server-side enhancements. Caching proxy techniques may improve client and/or server side solutions. For example, caching proxy techniques may improve client and/or server side solutions by providing additional information to the end to end system.

Caching proxy implementations may be middle box centric. A caching proxy may take advantage of an MEC/caching middle box platform. A proxy may be aware of cache content, backhaul load, ongoing DASH sessions, etc. A media server (e.g., an origin server) may redirect DASH sessions to a DASH caching proxy application. A caching proxy may avoid modifications to operation of clients (e.g., DASH clients), which may permit a caching proxy technique to work with a multitude of different clients. A caching proxy may not prioritize traffic. A DASH payload may be treated as being similar to or the same as other transport sessions. A system implementing a caching proxy may assume that some or all sessions have access to an equal portion of the available throughput.

A caching proxy (e.g., a DASH caching proxy application) may perform one or more of the following (e.g., via a caching proxy application). A caching proxy may operate to measure (e.g., continuously or periodically measure) the load (e.g., throughput and/or number of sessions) on a backhaul link. This may be used to determine (e.g., calculate or estimate) the capacity to download media segments from the origin server. The caching proxy may track the availability of segments in the cache (e.g., the local cache). The caching proxy may track ongoing DASH sessions (e.g., number, progression). The caching proxy may restrain, limit, or steer client segment choices. For example, the caching proxy may restrain, limit, or steer client segment choices by modifying one or more manifests (e.g., MPD files) associated with a (e.g., each) session. A caching proxy may cause a client to update the information obtained from a manifest (e.g., MPD file). For example, a caching proxy may cause a client to update the information obtained from a manifest by transforming a static MPD file into a dynamic MPD files and/or by adjusting an update frequency for an MPD file.

Design and implementation of a caching proxy may depend on one or more factors. For example, design and implementation of a caching proxy may depend on server capability, client capability, network type and capability, media access and delivery protocol, etc. One or more of the following may apply. An origin server may have the capacity to (e.g., and/or may be configured to) determine where a request comes from. An origin server may be able to (e.g., may be configured to) redirect to a DASH caching proxy application (e.g., the closest DASH caching proxy application). For example, an origin server may be able to redirect to a DASH caching proxy application by using a Universal Resource Locator (URL) rewriting and/or an HTTP redirection. Un-secure HTTP may be used to transport DASH. For example, un-secure HTTP may be used to transport DASH to permit middle box interception of sessions. Fair queuing (e.g., stochastic fair queuing) may be implemented on one or more (e.g., all) links. For example, fair queuing may be implemented on one or more links to provide global link level fairness amongst transport sessions. Backhaul link characteristics (e.g., bandwidth, delay) may be fixed and/or known. Backhaul may be a (e.g., may be the only) bottleneck that determines throughput from DASH servers beyond a cache proxy. An MEC/caching middle box platform may provide applications access to one or more media segment selection parameters. For example, an MEC/caching middle box platform may provide applications access to traffic measurements (e.g., total throughput and/or connection tracking), cached segment representations, etc.

Figure 5:
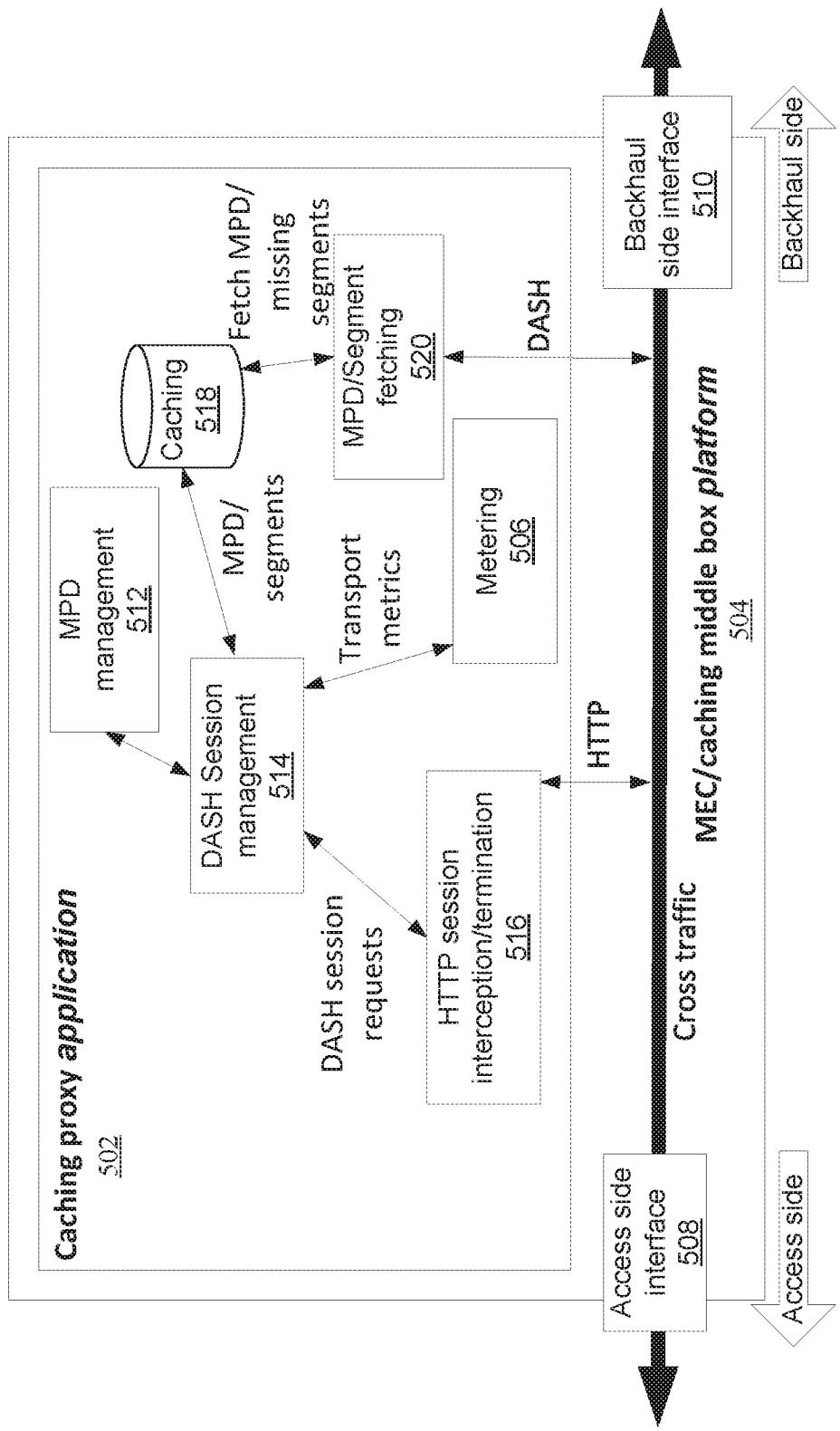
FIG. 5 shows an example of a high level system architecture comprising a DASH caching proxy application and an MEC/caching middle box platform.

FIG. 5 shows an example of a high level system architecture comprising a MEC/caching middle box platform 504 and/or a caching proxy application 502 (e.g., a DASH caching proxy application). The MEC/caching middle box platform 504 may comprise the caching proxy application 502 and/or the MEC/caching middle box platform 504 may be independent from the caching proxy application 502. FIG. 5 shows examples of one or more components which may be provided in a MEC/caching middle box platform 504 and/or a DASH caching proxy application 502.

A platform, such as an MEC/caching middle box platform 504, may have a capacity to (e.g., may be configured to) provide a caching proxy with access to information, such as user traffic. For example, an MEC/caching middle box platform 504 may have a capacity to provide a DASH caching proxy application 502 with access to information, such as user traffic. A DASH caching proxy may use information. For example, a DASH caching proxy may use information to terminate and/or observe (e.g., meter) user and/or origin server sessions.

An MEC/caching middle box platform 504 may offer a set (e.g., a standardized set) of application-platform services. A set of application-platform services may comprise one or more features. For example, a set of application-platform services may comprise one or more of infrastructure services (e.g., communication services, service registry), Radio Network Information services, and/or Traffic Offload Function (TOF). A Traffic Offload Function (TOF) may provide access to an uplink and/or downlink user plane with monitoring and/or traffic terminating capabilities.

The caching proxy (e.g., DASH caching proxy) may include one or more of the following. One or more of the following may be implemented in a caching proxy application and/or an MEC/caching middle box platform. For example, a metering 506, such as shown in the example in FIG. 5, may perform (e.g., continuously perform) one or more tasks. For example, a metering 506 may perform estimation of segment ON/OFF cycle time on an access link. An estimation value may be used. For example, an estimation value may be used as a base value for an MPD file refresh period. A metering may perform active transport session tracking. A metering may perform calculation of backhaul bandwidth used by a (e.g., one or more) non-DASH transport sessions, which may comprise sessions used by the proxy platform itself. e.g., an MEC/caching middle box platform 504. A metering may perform calculation of backhaul bandwidth used by a (e.g., one or more) DASH transport sessions. A metering may perform calculation (e.g., estimation) of available bandwidth for a (e.g., the next) DASH session on the backhaul link. A metering may perform bandwidth estimations on the access side link. Estimation of access side link bandwidth may be performed. For example, estimation of access side link bandwidth may be performed by a client implementation. The metering 506 may communicate via an access side interface 508 and/or a backhaul side interface 510.

A caching proxy application 502 (e.g., a DASH caching proxy application) may include an MPD management 512. The MPD management 512 may communicate with a DASH session management 514. The DASH session management 514 may communicate with HTTP session intercept/termination 516. For example, DASH session requests may be sent between DASH session management 514 and HTTP session intercept/termination 516. The DASH session management 514 may communicate with metering 506. For example, transport metrics (e.g., as described herein) may be sent between DASH session management 514 and metering 506. As shown in FIG. 5, DASH session management 514 may communicate with caching 518. For example, MPD segments may be sent between DASH session management 514 and caching 518. Caching 518 may communicate with MPD/Segment fetching 520. For example, caching 518 may communicate with MPD/Segment fetching 520 to fetch MPD/missing segments. MPD/Segment fetching 520 may communicate with MEC/caching middle box platform 504 via the DASH protocol. HTTP session interception/termination 516 may communicate with MEC/caching middle box platform 504 via the HTTP protocol.

Segment ON/OFF cycle time and DASH transport session throughput estimation may be provided.

Figure 6:
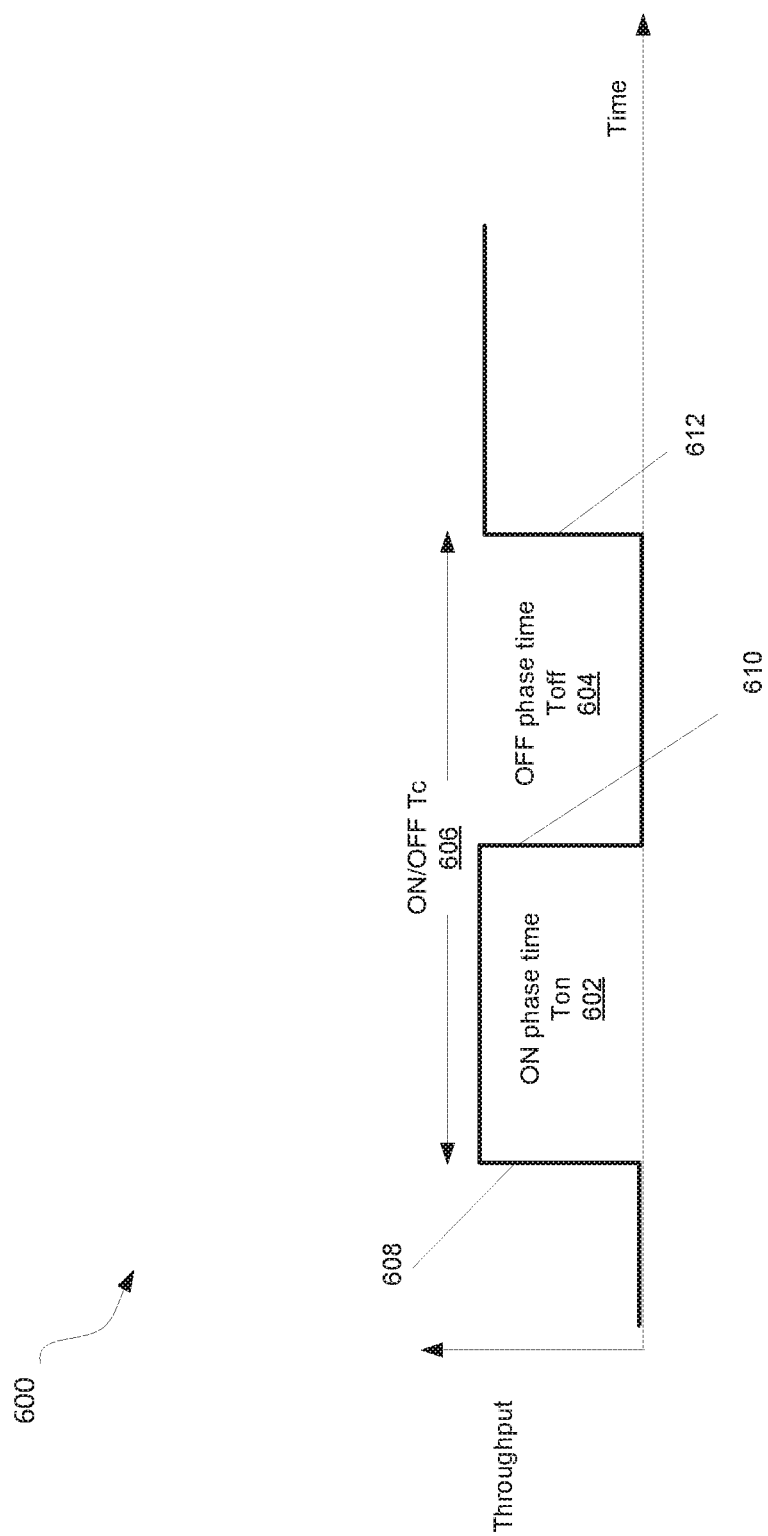
FIG. 6 shows an example of a DASH ON/OFF cycle.

FIG. 6 shows an example of a DASH ON/OFF cycle 600. An ON/OFF cycle time for a given transport session Tc may comprise an ON phase Ton 602 and an OFF phase Toff 604. A transport session Tc may be given by Eq. 1:

$$Tc = Ton + Toff \qquad \text{Eq. 1}$$

For example, during an ON phase a client may be actively downloading segment n+1 to be played back while during an OFF phase a client may be waiting for segment n to finish playing, and/or waiting for the fullness of a client buffer to fall below a threshold. A client may queue one or more segments for playback. ON and OFF phases may be delimited by one or more events, such as a segment download request message 608 and/or a transport session termination 610 (e.g., TCP FIN). One or more segment download request messages may be performed and/or one or more transport session terminations may be performed. For example, a subsequent segment download request 612 may be performed. The subsequent segment download request 612 may terminate an OFF phase and/or begin a subsequent ON phase.

An ON/OFF cycle time 606 may be evaluated on an access-side link. For example, an ON/OFF cycle time 606 may be evaluated on an access-side link to perform an evaluation when media segments are downloaded from cache.

A session Tc value may depend on media playback. For example, a session Tc value may depend on media playback, independent of network conditions. A session Tc value may correspond (e.g., directly correspond) to a timeframe covered by media chunks. Session Tc values may be tracked (e.g., continuously tracked). For example, session Tc values may be tracked in case timeframe characteristics of downloaded chunks change during DASH sessions.

Transport session bandwidth estimation may be performed on a backhaul link for one or more (e.g., all existing) sessions utilizing the backhaul link. Multiple types of transport sessions may be used. For example, background transport sessions and/or DASH transport sessions may be used.

A background transport session may comprise sessions ongoing on a backhaul link. A system may not have information about applications utilizing background transport sessions. A traffic volume $V_d$ of one or more (e.g., each) session (e.g., in a downlink direction) may be accumulated for active background sessions. Bandwidth utilized by a session after time T has elapsed since the beginning of the session may be given by Eq. 2:

$$BW_{session} = \frac{V_d}{T} \quad \text{Eq. 2}$$

As background transport sessions leave active mode, information may be discarded and the background transport sessions may no longer be part of a session count (e.g., total session count). For example, when a TCP session switches to a TIME_WAIT state, information may be discarded and the TCP session may no longer be part of a total session count DASH transport sessions may be transport sessions established by DASH clients. DASH transport sessions may be identified by a system. DASH transport sessions may follow an ON/OFF pattern. For example, DASH transport sessions may follow an ON/OFF pattern, as shown in the example in FIG. 6. A bandwidth utilization may be calculated over an entire transport session $T_c$ period. Sessions may not be cleared (e.g., may not be cleared immediately) when the sessions leave the active transmission state. For example, sessions may be kept until DASH session expiration. DASH transport sessions may be part of a total session count until DASH session expiration.

A potential issue with bandwidth utilization estimation may be that the calculated value may become available after an ON/OFF cycle ends. When an ON/OFF cycle ends, a new cycle may begin. The beginning of a new cycle may make a bandwidth estimation value obsolete. An approximation of bandwidth utilization may be calculated. For example, an approximation of bandwidth utilization may be calculated to avoid such obsolescence. A current value of bandwidth utilization may be provided depending on when the value is requested. One or more of the following may apply.

A request for a bandwidth estimation value may be made during a (e.g., the first) ON/OFF cycle. Bandwidth utilized by a session $BW_{session}$ may be set to the approximated value specified by the MPD file. For example, bandwidth utilized by a session $BW_{session}$ may be set to the approximated value specified by the MPD file when a request is made during the first ON/OFF cycle.

A request for a bandwidth estimation value may be made during the Ton phase of the $n^{th}$ ON/OFF cycle. Bandwidth utilized by a session $BW_{session}$ may be set to a variety of values when a request for a bandwidth estimation value is be made during the Ton phase of the $n^{th}$ ON/OFF cycle. Bandwidth utilized by a session $BW_{session}$ may be set to the value specified by the MPD file. For example, bandwidth utilized by a session $BW_{session}$ may be set to the value specified by the MPD file when the segment being downloaded is of a different resolution than the previous segment. Bandwidth utilized by a session $BW_{session}$ may be set to the value of $BW_{session}$ calculated during the previous segment download for this DASH session. For example, bandwidth utilized by a session $BW_{session}$ may be set to the value of $BW_{session}$ calculated during the previous segment download for this DASH session when the downloaded segment is of the same resolution as the previous segment.

A request for a bandwidth estimation value may be made during the Toff phase of the $n^{th}$ ON/OFF cycle. Bandwidth utilized by a session $BW_{session}$ may be set to $$\frac{V_d}{T_c},$$

where the $T_c$ value from the previous cycle may be used while $V_d$ may correspond to the accumulated data volume during the ON phase.

Available bandwidth may be calculated. $BW_{backhaul}$ may be available bandwidth on the backhaul link. N may be the number of active transport sessions (DASH and non-DASH). Each existing transport session may utilize available bandwidth given by Eq. 3:

$$BW_{max\_current} = \frac{BW_{backhaul}}{N} \quad \text{Eq. 3}$$

Bandwidth utilized by a session $BW_{session}$ may underutilize available bandwidth (e.g., $BWU_{session} < BW_{max\_current}$). For example, bandwidth utilized by a session $BW_{session}$ may underutilize available bandwidth due to a bottleneck (e.g., a bottleneck elsewhere) on the client server path and/or due to a lower throughput session requirement and/or application layer load. Underutilization may create room for additional throughput for a session capable of taking advantage of it.

Available bandwidth for downloading the next DASH segment may be estimated. For example, available bandwidth for downloading the next DASH segment may be estimated using one or more of the following: (i) available bandwidth for downloading the next DASH segment may be estimated by calculating an available bandwidth per session $BW_{max\_current}$, e.g., as indicated in Eq. 3; (ii) available bandwidth for downloading the next DASH segment may be estimated by calculating a bandwidth utilization value per session $BW_{session}$ of each existing session, e.g., as indicated in Eq. 2; and/or (iii) available bandwidth for downloading the next DASH segment may be estimated identifying and counting each underutilizing session $BWU_{session}(n) < BW_{max\_current}$, where UC may be the count of underutilizing sessions. The available bandwidth of the next DASH segment $BW_{DASH}$ may be given by Eq. 4:

$$BW_{DASH} = \frac{BW_{backhaul} - \sum_{n=1}^{UC} BWU_{session}(n)}{N + 1 - UC} \quad \text{Eq. 4}$$

A link may have a full duplex capacity of 10 Mbps with 4 transport sessions. The available bandwidth for each session may be calculated. For example, the available bandwidth for each session may be calculated in accordance with Eq. 3 as follows:

$$BW_{max\_current} = \frac{10}{4} = 2.5 \text{ Mbps.}$$

Two of the four transport sessions may use 1 Mbps. e.g., underutilization where underutilization count UC=2, while two other sessions use 4 Mbps, e.g., overutilization. The available bandwidth for downloading the next DASH segment may be calculated in accordance with Eq. 4 as follows:

$$BW_{DASH} = \frac{10 - (1+1)}{4+1-2} = \frac{8}{3} = 2.67 \text{ Mbps.}$$

A metering may rely on one or more platform functionalities and/or the metering may implement metering by monitoring IP traffic. As an example of a platform implemented on a plain Linux system, subsystems such as IPTABLES, NFQUEUE and/or CONNTRACK may be used as a base for implementation of a metering. An implementation of a metering system may vary from platform to platform. For example, an implementation of a metering system may vary from a portion of a metering system implemented on and/or using a platform versus a portion of a metering system being part of an application.

An HTTP session interception/termination may terminate and/or intercept one or more HTTP sessions. An example of HTTP session termination may comprise an HTTP server that may trigger the execution of subsystems of the application (e.g., the remaining subsystems of the application). A variety of multiplatform HTTP servers may terminate and/or intercept one or more HTTP sessions. For example, an Apache server may terminate and/or intercept one or more HTTP sessions.

Session interception may involve additional processing. For example, session interception may involve additional processing relative to termination. Session interception may involve an IP traffic interception mechanism, which may be platform dependent. As an example of a Linux platform, an IPTABLES module may permit interception of transport sessions, which may be forwarded to a custom server module. TCP/IP protocol layers may be unable to limit interception to a specific set of resources (e.g., only DASH sessions). An issue may exist given that TCP/IP protocol layers may be unable to limit interception to a specific set of resources. At the application level, a set (e.g., a table) of resources may be specified (e.g., URLs) for which a request may be treated (e.g., treated locally) while other requests may be forwarded to the location of the target resource. Specifying the set of resources and/or forwarding the requests may resolve the above issue. DASH sessions may be identified among other sessions at an application layer. For example, DASH sessions may be identified among other sessions at an application layer by following one or more heuristic rules, such as one or more of the following. A DASH session (e.g., each DASH session) may start (e.g., always start) by requesting an MPD file. The MPD file may be recognized by its extension and/or its content. Subsequent requests may target the segments specified in the MPD file. A session may be forwarded to a target resource. For example, a session may be forwarded to a target resource when a request does not target an MPD file or a segment that has been specified in the MPD file. If a segment request is identified, the traffic may be intercepted and/or the session may be terminated.

Figure 7:
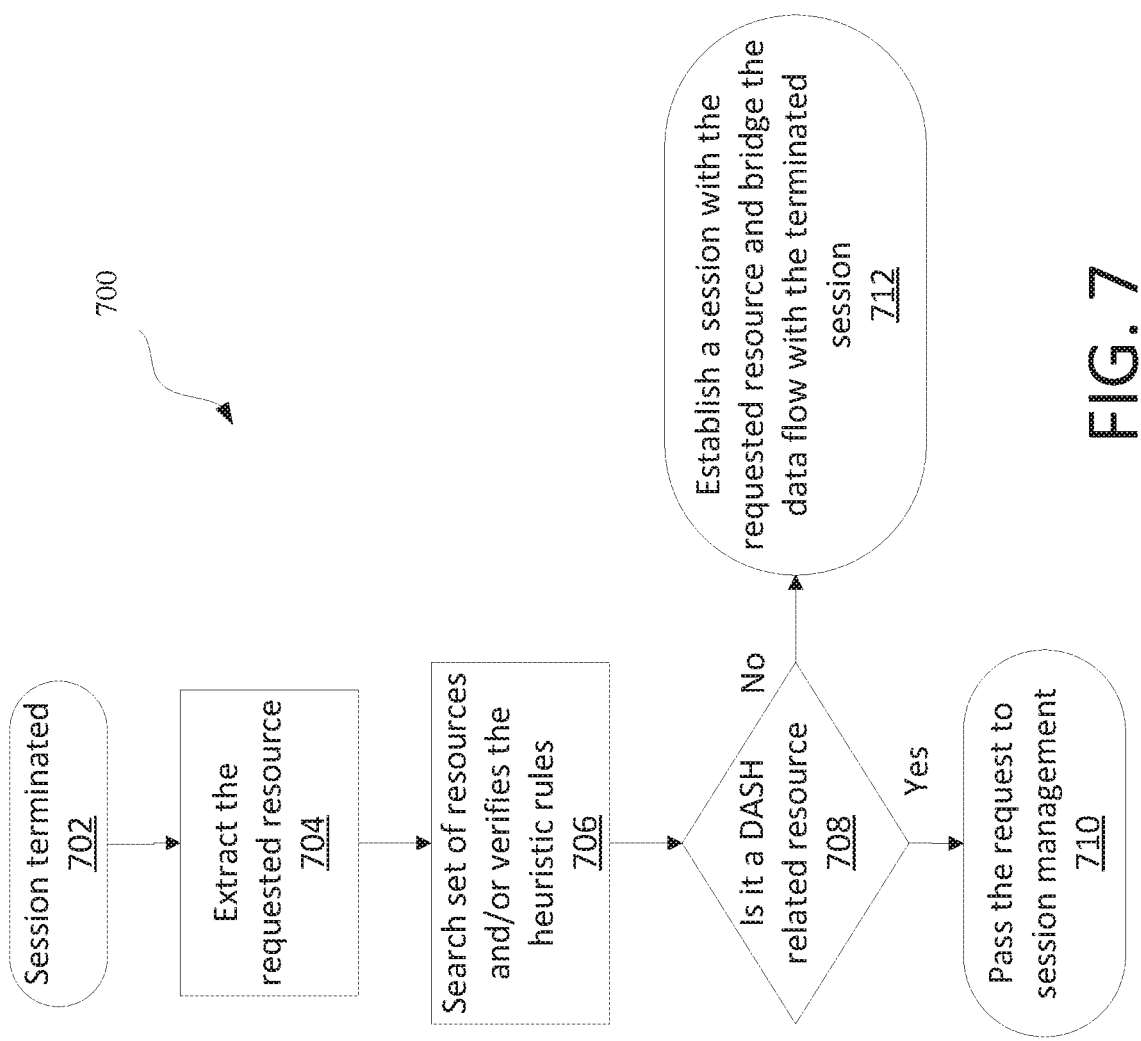
FIG. 7 shows an example of a DASH session interception process.

FIG. 7 shows an example of a DASH session interception 700. One or more elements of DASH session interception 700 may be performed by TCP/IP layer processing, HTTP server processing, and/or Application layer processing. At 702, a session may be terminated. For example, the caching proxy and/or an element of the caching proxy (e.g., the HTTP session interception/termination element of the caching proxy) may act as a termination point and/or an endpoint for the session. For example, at 702, an HTTP port TCP/IP session may be terminated. For example, the HTTP port TCP/IP session may be terminated by TCP/IP layer processing. The session may be terminated as a result of the processing shown in example MPD request 900, shown in FIG. 9, and/or the example media segment request process, shown in FIG. 10. At 704, a resource may be requested and/or the requested resource may be extracted. For example, the resource may be requested and/or the requested resource may be extracted by HTTP server processing.

At 706, a set of resources may be searched. For example, at 706, a set of DASH resources may be searched and/or rules (e.g., heuristic rules) may be verified. At 708, it may be determined whether the resource is a DASH related resource. If the resource is not a DASH related resource, at 712, a session may established with the requested resource. Data flow may be bridged with the terminated session. If, at 708 the resource is a DASH related resource, the request may, at 710, be passed to a session management (e.g., the DASH session management) (e.g., DASH session management 514).

A segment fetching may download segments (e.g., required segments). For example, a segment fetching may be MPD/Segment fetching 520. A segment fetching may receive requests from a caching system (e.g., caching 518) for MPD and/or media segments files. Requests may be transformed into DASH HTTP requests. A segment fetching may be implemented. For example, a segment fetching may be implemented using one or more HTTP client libraries (e.g., any available HTTP client library).

A caching may manage the caching of MPD and/or media segment files. A caching may provide one or more of the following. A caching may provide URL to file mapping, which may be queried for presence of segments. Segments may be mapped to a specific MPD file URL. For example, one or more segments (e.g., each segment) may be mapped to an associated MPD. One or more segments, for example, may be mapped to a URL within the MPD file, which can be used to retrieve the segment.

The caching may provide eviction de-prioritization of segments referenced by an MPD file. Eviction de-prioritization may reduce the likelihood of one or more segments being evicted (e.g. removed from) the cache. For example, the segment identified in a request (e.g., an incoming segment request) may be mapped to an MPD file (e.g., an associated MPD file). Other segments from an MPD file (e.g., the same MPD file) may be identified. For example, other segments from the same MPD file, which may be expected to be subsequently requested, may be identified. Eviction de-prioritization messages may be sent. For example, eviction de-prioritization messages may be sent to reduce the likelihood of these other segments from being evicted from the cache.

The caching may provide MPD file replacement. An MPD file replacement feature may (e.g., may be required to) support original dynamic MPD files. An old version of an MPD file may be replaced by a new MPD file. For example, an old version of an MPD file may be replaced by a new MPD file when the new MPD file is downloaded. Relationships between an MPD file and stored media segments may remain and/or change. Cached segments may become obsolete. For example, cached segments may become obsolete when a media segment specification changes and/or the relation of the MPD file with the stored media segments is invalid. A system may evict invalid segments (e.g., explicitly) and/or may rely on a cache aging process.

An artifact (e.g., each artifact) stored in cache may be described by one or more values. For example, an artifact stored in cache may be described by a URL, last request time, number of requests, artifact type (e.g., MPD or media), URL of the referring MPD file (e.g., for a media segment artifact), list of media segments currently in cache (e.g., for an MPD file artifact), etc. Media files may be requested, for example, in a single request or in multiple byte range requests. A caching may manage requested segments separately, e.g., for byte range requests.

An MPD file management may be responsible for parsing MPD files into data structures (e.g., internal data structures). For example, an MPD file management may be MPD management 512. An MPD file management may generate the MPD files from internal data structures. An MPD file management may provide one or more of the following.

An MPD file management may provide MPD file transformation from static to dynamic. Static MPD files may be transformed into dynamic MPD files. For example, static MPD files may be transformed into dynamic MPD files so that the client may periodically re-download an MPD file to account for one or more changes. For example, the MPD file being dynamic may indicate to the client to refresh (e.g., periodically refresh) the MPD file, for example, as indicated by a refresh period in the file.

An MPD file management may perform adaptation of the set of representations. A client may be steered to one or more segment representations and/or a set of segments. For example, a client may be steered to one or more segment representations and/or a set of segments by modifying a set of representations definitions. Modification of available segments may depend on backhaul bandwidth (e.g., available backhaul bandwidth) and/or the availability of segments in cache (e.g., cache content).

Segment representations may or may not be cached. A backhaul may have 5 Mbps available. An MPD file (e.g., an original and/or previously modified MPD file) may offer segment representations at resolutions (e.g., varying resolutions) with download bandwidths of 6 Mbps, 2 Mbps, and/or 300 kbps. An MPD file management in a caching application may modify the MPD file. For example, an MPD file management in a caching application may modify the MPD file by eliminating the 6 Mbps bandwidth segment representation and/or providing the modified MPD file to a client (e.g., via periodic update of the MPD file), thereby managing segment availability based on available backhaul bandwidth and/or the availability of segments in cache.

A 6 Mbps bandwidth segment representation may be cached. A backhaul may have 1 Mbps available. An MPD file (e.g., an original or previously modified MPD file) may offer segment representations at resolutions (e.g., varying resolutions) with download bandwidths of 6 Mbps, 2 Mbps, and/or 300 kbps. An MPD file management in a caching application may modify the MPD file. For example, an MPD file management in a caching application may modify the MPD file by eliminating the 2 Mbps bandwidth segment representation and/or providing the modified MPD file to a client (e.g., via periodic update of the MPD file), thereby managing segment availability based on available backhaul bandwidth and the availability of segments in cache.

An MPD file management may provide media segment URL extraction. A list of URLs may be provided that point to media files referred by the MPD file. For example, a list of URLs may be provided that point to media files referred by the MPD file based on various possible queries. A media segment URL extraction may permit derivation of URLs for media segment files at one or more (e.g., all) resolutions that follow a (e.g., a specific) media segment file URL.

A DASH session management may manage DASH sessions. For example, a DASH session management may manage DASH sessions by guiding clients to choose media segments (e.g., appropriate media segments). Clients may choose appropriate media segments by considering current local segment availability (e.g., in the cache server) and/or current backhaul conditions. A DASH session management may include one or more of the following. A DASH session management may include dash session tracking. A DASH session management may include dynamic MPD file conversion. A DASH session management may include MPD file refresh. A DASH session management may include request processing (e.g., MPD request, media segment request). A DASH session management may include session termination and/or prefetching coordination.

DASH Session tracking may be performed by client activity. For example, DASH Session tracking may be performed by client activity, such as MPD file refreshes and/or downloads of media segments referred by an MPD file. A session may be considered to be finished. For example, a session may be considered to be finished when an MPD refresh and/or a segment download request have not been received for a duration of an inactivity timer, such as one or more ON/OFF cycles. An inactivity timer may be restarted. For example, an inactivity timer may be restarted when an MPD refresh and/or a segment download request occurs. A timer may be set to a multiple of the latest estimate value of the ON/OFF cycle time for a session $T_c$. A default value (e.g., a few seconds) may be used. For example, a default value may be used when a latest estimate value is not available, such as when a session is starting.

A DASH session management (such as DASH session management 514 of FIG. 5) may send an eviction de-prioritization command to a caching unit (such as caching unit 518 of FIG. 5). For example, a DASH session management may send an eviction de-prioritization command to a caching unit when an event is received for an active DASH session (e.g., each time). An eviction de-prioritization command may decrease the probability of an eviction of segments that may follow a segment. For example, an eviction de-prioritization command may decrease the probability of an eviction of segments that may follow a segment being downloaded and/or played. An eviction de-prioritization may affect segment representations (e.g., all available segment representations, such as resolutions).

A session state structure may describe the state of a DASH session. A session state structure may include one or more of the following. A session state structure may include a client identification (e.g., client IP address). A session state structure may include an MPD file URL. A session state structure may include a session inactivity timer (e.g., when this timer expires the session may terminated). A session state structure may include session ON/OFF cycle times. A session state structure may include a reference to a dynamic MPD file refresh process (e.g., when the original MPD file is dynamic). A session state structure may include a URL of media (e.g., the media segment being downloaded by the client, such as a last client request).

Static MPD files (e.g., original static MPD files) may be modified to generate dynamic MPD files. The dynamic file may indicate to a client and/or force a client to refresh (e.g., periodically refresh) a client's version of the MPD file. The generated MPD file may be adapted to current (e.g., prevailing) network conditions. An additional MPD refresh process may be created. For example, an additional MPD refresh process may be created when an MPD file (e.g., an original MPD) file is dynamic. An additional MPD refresh process may manage changes to an MPD file (e.g., an original dynamic MPD file). One or more of the following may apply to refreshing.

An MPD refresh process may fetch (e.g., periodically fetch) a version (e.g., a new version) of an original dynamic MPD file from an original server. A refresh period may be set to the value specified in the original dynamic MPD file. A previous version of the MPD file may be evicted from the cache and replaced with the new one. For example, a previous version of the MPD file may be evicted from the cache and replaced with the new one upon a refresh (e.g., upon each refresh). A generated dynamic MPD file refresh period may be shorter than the period specified in the original dynamic MPD file. DASH sessions referring to an original dynamic MPD file may be matched with the refresh process. A refresh process may be terminated. For example, a refresh process may be terminated when a (e.g., each) DASH session referring to an original dynamic MPD file has ended.

MPD file refresh may be provided. A new dynamic MPD file may be generated. For example, a new dynamic MPD file may be generated upon a request from the client (e.g., at every request from the client). Content of a generated MPD file may be based on the original MPD file and/or may be adapted to current cache content and/or current network conditions.

A client may download a dynamic MPD file (e.g., may download a dynamic MPD file periodically). For example, a client may download a dynamic MPD file periodically according to a refresh period specified in the MPD file. A refresh value may be set to the duration of a segment ON/OFF cycle time Tc.

Figure 8:
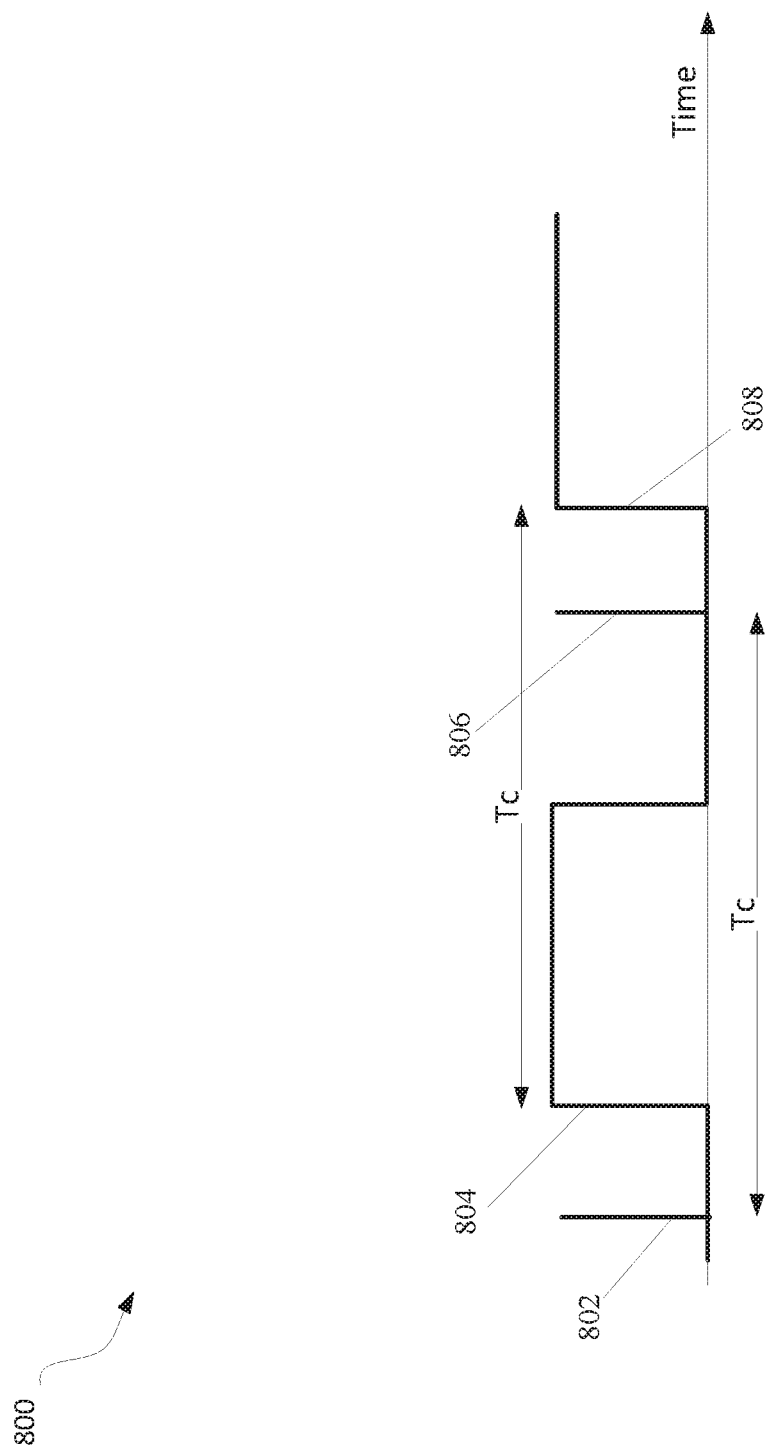
FIG. 8 shows an example of a media presentation description (MPD) file refresh period based on ON/OFF cycle value.

FIG. 8 shows an example of an MPD file refresh period 800 based on ON/OFF cycle value. As depicted in FIG. 8, a request of the MPD file 802 may occur before the request for a segment 804. One or more MPD file requests and/or one or more segment download requests may be performed. For example, subsequent MPD file requests (such as 806) and/or subsequent segment download requests (such as 808) may be performed. As shown in FIG. 8, setting the period to Tc may ensure that the client is notified about the media segment availability before determining which representation of the next segment to request. A default value may be used for a value. For example, a default value may be used for a value when a Tc value is unavailable (e.g., initially unavailable). A refresh time may be (e.g., may have to be) less than or equal to an MPD value provided in the original MPD. For example, a refresh time may be less than or equal to an MPD value provided in the original MPD when an original MPD is dynamic.

A DASH session management may provide request processing, such as MPD file refresh and/or media segment request processes.

Figure 9:
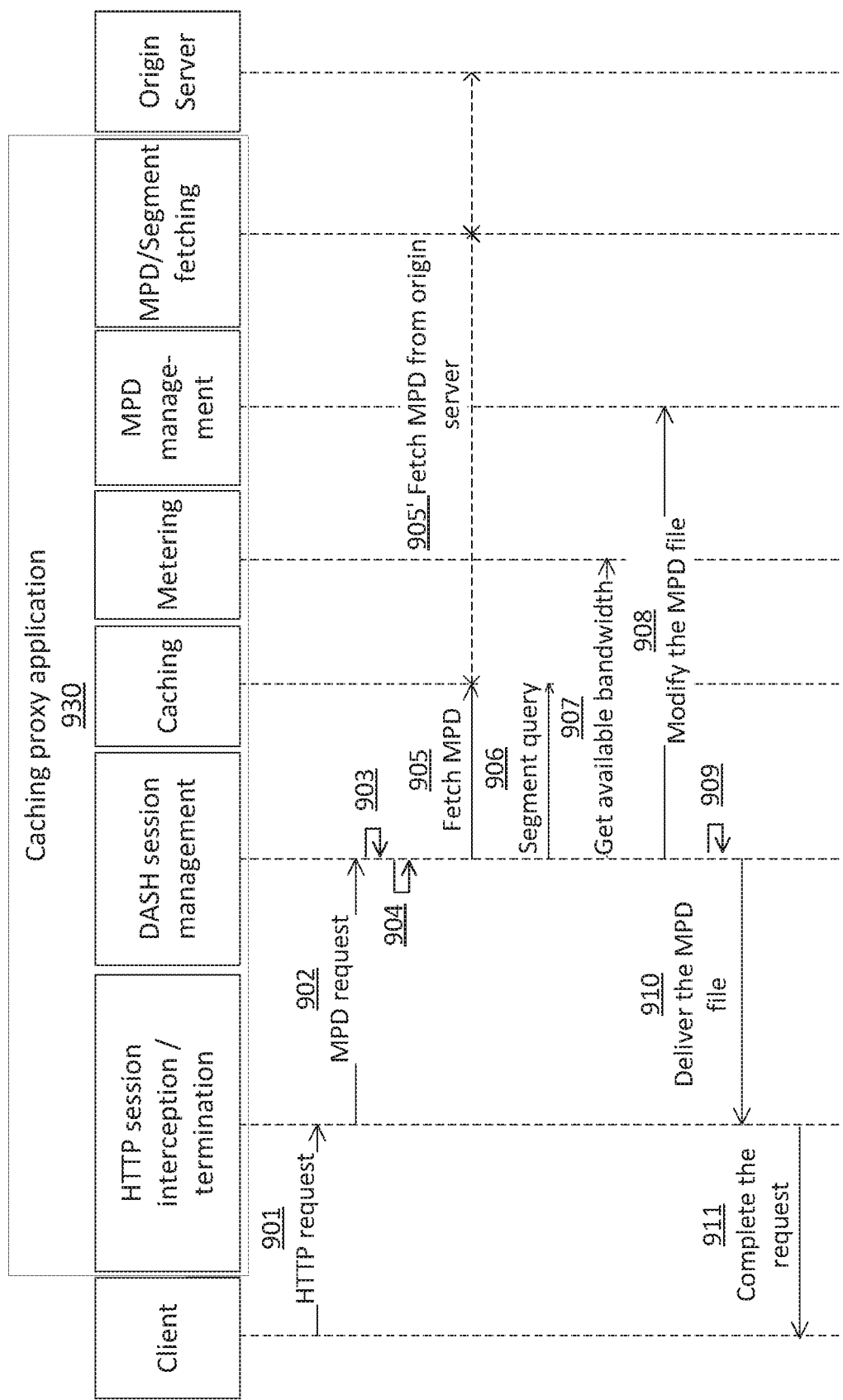
FIG. 9 shows an example of an MPD request.

FIG. 9 shows an example of an MPD request, where one or more of the illustrated features may be provided. FIG. 9 depicts examples of interactions between one or more components (e.g., different components) during the processing of an MPD request. Examples of interactions are depicted and/or internal operations may not be not depicted. Although the interactions may be shown to pertain to a particular component, one of skill in the art would understand that the interactions may pertain to one or more of the components shown on FIG. 9. For example, although 905 Fetch MPD is shown to derive from DASH session management and to end at Caching, 905 Fetch MPD may be performed by one or more of the components (e.g., MPD management) shown on FIG. 9. Also, or alternatively, the interactions may pertain to one or more components not shown on FIG. 9.

At 901, an HTTP request from the client may be received by a caching proxy application 930 (e.g., a caching proxy application 502, such as a DASH Caching proxy application). An HTTP request from the client may be received by an HTTP interception/termination that, for example, may be within the Caching proxy application 930. The HTTP request at 901 may be a request for an MPD suitable for use in a DASH streaming session. At 902, an MPD request may be sent by the HTTP interception/termination. The MPD request at 902 may be sent in response to the HTTP request at 901. The MPD request at 902 may be sent based on the HTTP interception/termination determining that the received HTTP request at 901 is a request for an MPD. Such determination may be made using the process illustrated in FIG. 7, for example. The MPD request at 902 may be received by a DASH session management. At 903, a DASH session (e.g., a new DASH session) may be created. For example, at 903, a DASH session (e.g., a new DASH session) may be created when an MPD file request does not belong to an existing DASH session. A new session may be registered to be monitored and a session state structure may be created. At 904, a session state structure may be fetched, e.g., fetched from cache. For example, at 904, a session state structure may be fetched when an MPD file request belongs to an existing DASH session. At 905, the MPD may be fetched from cache and/or at 905' the MPD may be fetched from an origin server. For example, at 905, the MPD may be fetched from cache and/or at 905' the MPD may be fetched from an origin server when the MPD (e.g. a current, unexpired version of the MPD) is not in cache. At 906, a caching (e.g., a local caching) may be queried for the availability of one or more representations (e.g., each representation and/or resolution) for segments (e.g., media segments, such as the next media segments). For example, a subset of one or more media segments may be stored within the cache (e.g., local cache, such as cache of the middle box platform). The next segment may be the first segment. For example, the next segment may be the first segment when a new DASH session occurs. A URL for a segment currently being downloaded for an ongoing session may be stored in the session state structure. Based on that value, the next segment reference may be derived. At 907, the available backhaul bandwidth $BW_{Dash}$ may be acquired from the metering.

At 908, an MPD file may be modified. One or more of the following may apply. References may be removed. For example, references may be removed from the MPD of segments that are not cached and that require a backhaul bandwidth superior to the available bandwidth ($BW_{Dash}$). A static MPD type may be changed to a dynamic MPD. A refresh period may be set according to one or more refresh rules. An example of a refresh rule is for a new session (e.g., Tc is not available) where the first ON/OFF cycle has not finished yet, the lowest of the following values may be used: (i) a default (e.g., arbitrary) refresh value and (ii) a refresh value specified in an MPD file (e.g., when an original MPD is dynamic). An example of a refresh rule is for an existing session (e.g., Tc value is available), the lowest of the following values may be used: (i) a calculated ON/OFF cycle time Tc and (ii) a refresh value specified in the MPD file (e.g., when an original MPD is dynamic).

At 909, a session inactivity timer may be started and/or restarted. At 910, an MPD file may be delivered to an HTTP session interception/termination. At 911, an HTTP session interception/termination may complete a client request. For example, at 911 the modified MPD file may be delivered to the client in response to the client request 901. The example DASH session interception 700, shown in FIG. 7, may be used in conjunction with the example MPD request 900, shown in FIG. 9, and/or the example media segment request process, shown in FIG. 10.

Figure 10:
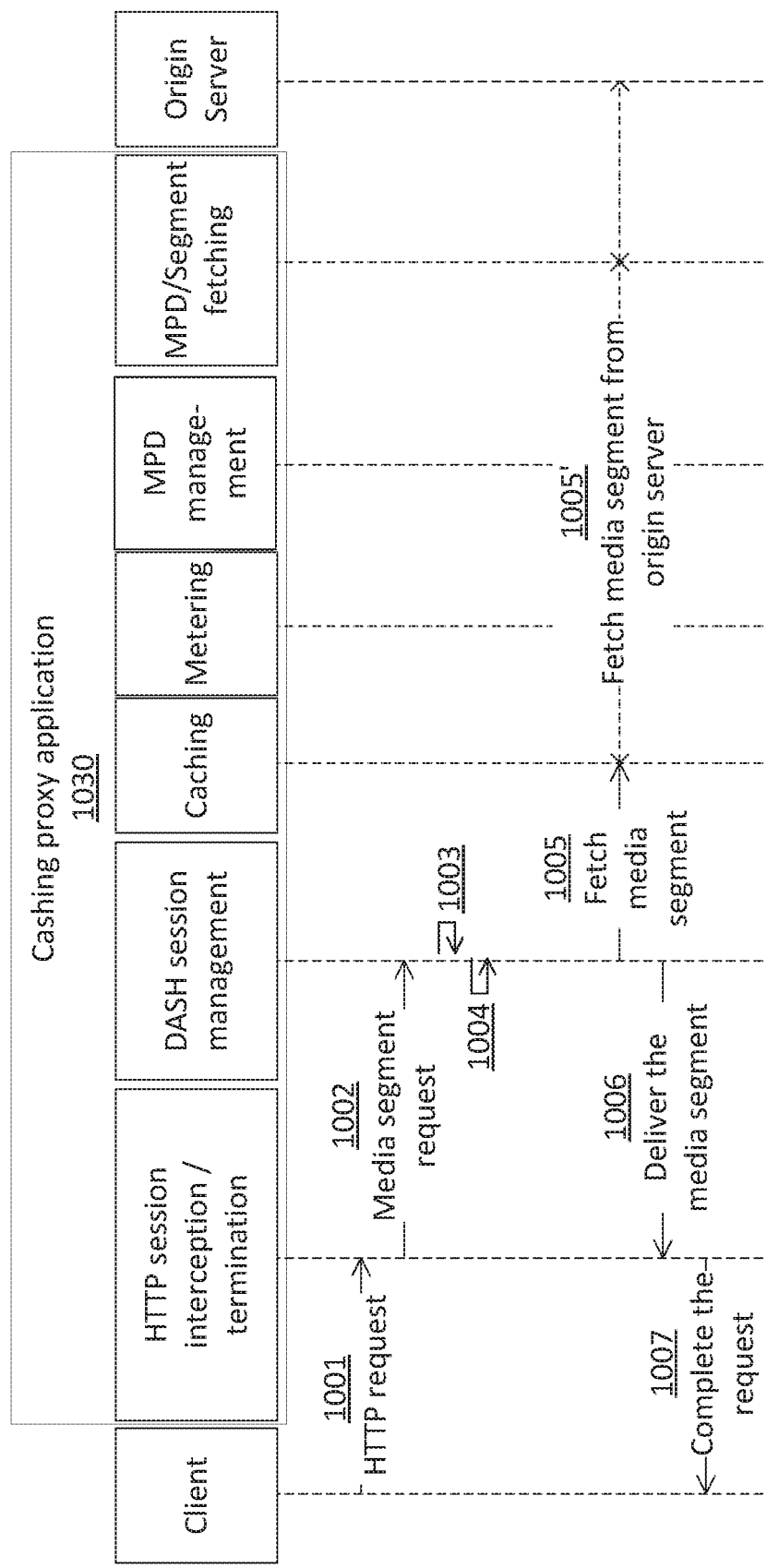
FIG. 10 shows an example of a media segment request process.

FIG. 10 shows an example of a media segment request process, where one or more of the illustrated features may be provided. FIG. 10 depicts an example of interactions between examples of different components during the processing of a media segment request. Examples of interactions are depicted while internal operations may not be depicted. Although the interactions may be shown to pertain to a particular component, one of skill in the art would understand that the interactions may pertain to one or more of the components shown on FIG. 10.

At 1001, an HTTP request from the client may be received by a caching proxy application 1030 (e.g., a caching proxy application 502, such as a DASH Caching proxy application). An HTTP request from the client may be received by an HTTP interception/termination. At 1002, the HTTP interception/termination may send a media segment request. The HTTP interception/termination may send the media segment request in response to receiving the HTTP request from the client at 1001. The HTTP interception/termination may send the media segment request based on determining that the HTTP request from the client at 1001 is a request for a media segment. Such determination may be made using the process illustrated in FIG. 7, for example. The request for a media segment at 1002 may be received by a DASH session management. At 1003, a request may be matched with an existing monitored DASH session (e.g., session state structure). At 1004, a requested segment URL in the session state structure may be updated. For example, the segment URL in the session state may be updated to indicate that a request was made, that the request was matched with an existing monitored DASH session, and/or what the outcome of the request was (e.g., whether a cached version of the segment was returned to the requester). At 1005, a segment (e.g. the requested segment) may be fetched from cache. For example, as indicated by 1005, a segment (e.g. the requested segment) may be fetched from cache when available. At 1005', a segment (e.g. the requested segment) may be fetched from the origin server. For example, at 1005', a segment (e.g. the requested segment) may be fetched from the origin server when not available in cache. At 1006, a media segment (e.g. the requested segment) may be delivered to the HTTP session interception termination. At 1007, an HTTP session interception/termination may complete the client request. For example, the HTTP session interception/termination may transmit the media segment to the client in response to the HTTP request sent by the client at step 1001.

Session termination may be provided (e.g., by A DASH session management). An MPD file may specify media segment file names. For example, an MPD file may specify media segment file names as templates with wildcards comprising an increasing segment count. An MPD file may or may not associate a time frame with each period. Detecting the end of the media may be straightforward. For example, detecting the end of the media may be straightforward when a timeframe is associated. The end of the media may be indicated to the client by the 404 HTTP error code. For example, the end of the media may be indicated to the client by the 404 HTTP error code when a time frame is not specified. A DASH caching proxy application may bridge to the client an error (e.g., any errors) that may be received. For example, a DASH caching proxy application may bridge to the client an error that may be received when it attempts to download and/or prefetch a media segment (e.g., a required media segment).

Prefetching coordination may be provided (e.g., by a DASH session management). Media segment prefetching may enhance user experience. Prefetching rules may be applied. For example, prefetching rules may be applied to avoid causing competition (e.g., unnecessary competition) between a prefetching process and media segments being downloaded by active sessions. One or more of the following may apply.

An example of a prefetching rule may include prefetching being (e.g., may only be) performed for segments ahead of segments being requested by the client.

An example of a prefetching rule may include prefetching being (e.g., may only be) performed for active DASH sessions.

An example of a prefetching rule may include prefetching being prioritized for segments that may belong to a time frame (e.g., a time frame not yet cached), for example, compared to prefetching segments (e.g., segments of a higher quality) for the same timeframe. When low quality segments are cached covering a first timeframe of the media, a system may try prefetching segments (e.g., the highest possible quality segments) that cover following time frames.

An example of a prefetching rule may include sessions referring to a common MPD file that may be prioritized. For example, where there are one or more (e.g., four) active sessions, and among the active sessions one or more (e.g., two) refer to the same MPD file X (e.g., while the other sessions, such as two other sessions, refer to Y and/or Z MPD files, respectively), media segments referred by MPD file X may be prefetched.

An example of a prefetching rule may include prefetching performed for one or more session, for example, when multiple pre-fetching operations permit retrieval of media segments (e.g., media segments of the highest possible quality). For example, when there are one or more (e.g., four) sessions (e.g., two sessions referring to MPD X and two sessions referring to MPD Y), prefetching may (e.g., may only) occur for segments referred to by one or more (e.g., both) MPD files, for example, when possible to fetch the best quality segments available for both MPD files. A session (e.g., either session) may be picked randomly and/or in accordance with a policy.

An example of a prefetching rule may include prefetching that may (e.g., may only) occur when there are no DASH sessions downloading any segments from the origin server.

An example of a prefetching rule may include prefetching that may (e.g., may only) occur on media segments (e.g., entire media segments, such as no prefetching for byte range requests).

An example of a prefetching rule may include prefetching that may (e.g., must) follow a process. For example, an example of a prefetching rule may include prefetching that may follow the same process as request processing, although requests may be issued by a DASH proxy application instead of being issued by a client.

A DASH protocol may enable clients to download media content (e.g., download media content progressively) with a capability to choose from various content representations (e.g. versions of the content prepared with different resolutions, bitrates, or other properties). The content representations may be associated with download bandwidths (e.g., different download bandwidths). A client may select a representation. For example, a client may select a version of the content at a particular resolution based on the estimated bandwidth. A client may be informed about the availability of content representations through a Media Presentation Description (MPD) file, which may be downloaded before downloading media content.

A DASH caching proxy application may be placed. For example, a DASH caching proxy application may be placed as a middle box between a high performance access network (e.g., a high performance RAN) and a limited shared backhaul link (e.g., an ADSL line). Backhaul link limitations may cause a bottleneck in throughput and/or delay on the data path between a client and an origin server. A DASH caching proxy application may cache DASH content and manage DASH requests issued by clients that may not have a reliable technique to estimate cache content and backhaul limitations. Request management may comprise taking into consideration the availability of cached segments and/or the load on the backhaul link. For example, request management may comprise taking into consideration the availability of cached segments and/or the load on the backhaul link while modifying the content of an original DASH MPD file. MPD file modifications may prevent a client from choosing media resolutions that may decrease a quality of experience and/or cause congestion on a backhaul link.

Figure 11A:
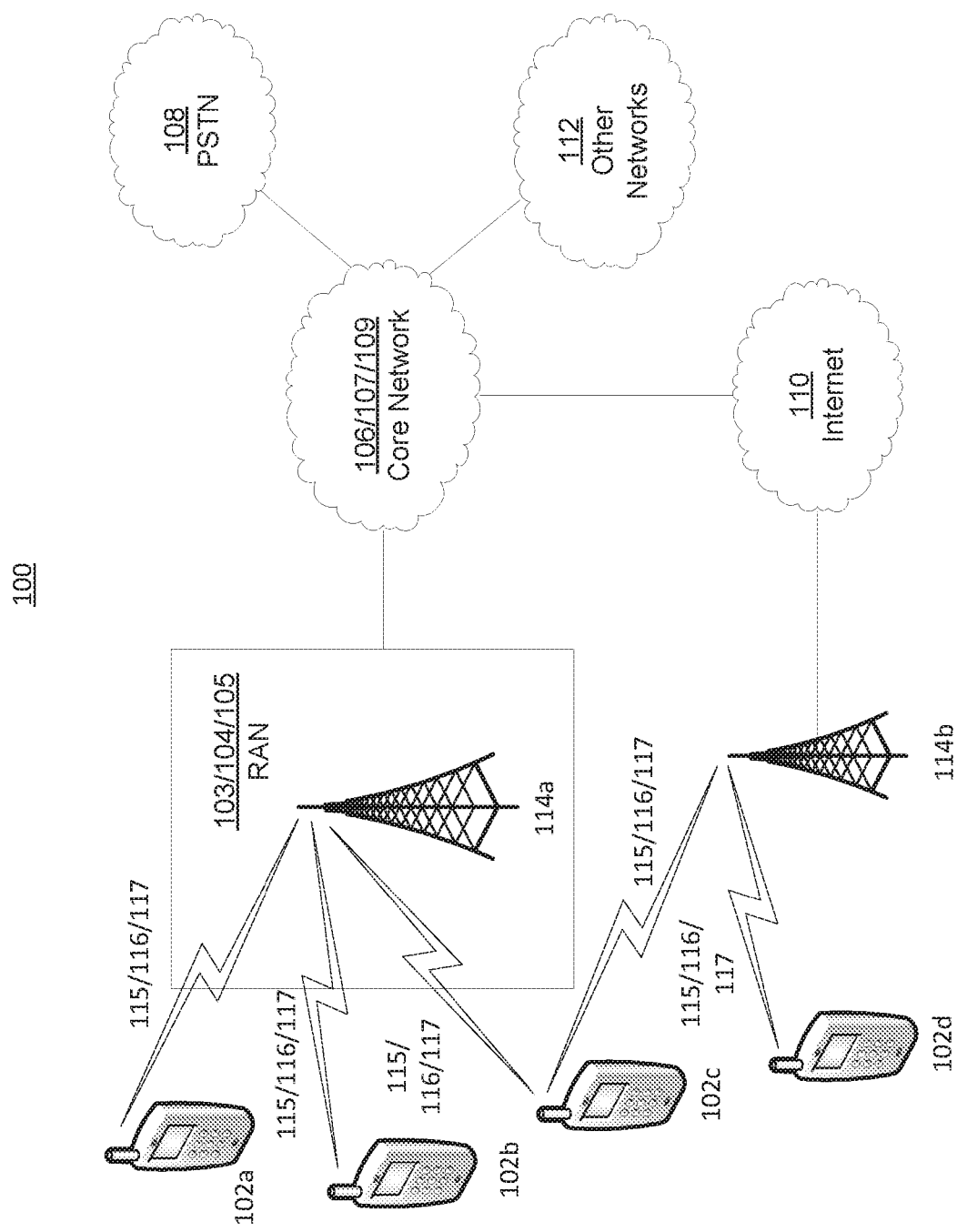
FIG. 11A is a system diagram of an example communications system in which disclosed technology be implemented.

FIG. 11A is a diagram of an example communications system 100 in which one or more disclosed techniques may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 11A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed technology contemplates any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. In an example, the base station 114a may include three transceivers, i.e., one for each sector of the cell. In an example, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an example, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an example, the base station 114a and the WTRUs 102a, 102b. 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 11A may be a wireless router, Home Node B, Home eNode B, or access point, for example, and may utilize any suitable RAT for facilitating wireless connectivity in a localized area, such as a place of business, a home, a vehicle, a campus, and the like. In an example, the base station 114b and the WTRUs 102c, 102d may implement a radio technology such as IEEE 802.11 to establish a wireless local area network (WLAN). In an example, the base station 114b and the WTRUs 102c, 102d may implement a radio technology such as IEEE 802.15 to establish a wireless personal area network (WPAN). In an example, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 11A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 11A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 11A may be configured to communicate with the base station 114a, which may employ a cellular-based radio technology, and with the base station 114b, which may employ an IEEE 802 radio technology.

Figure 11B:
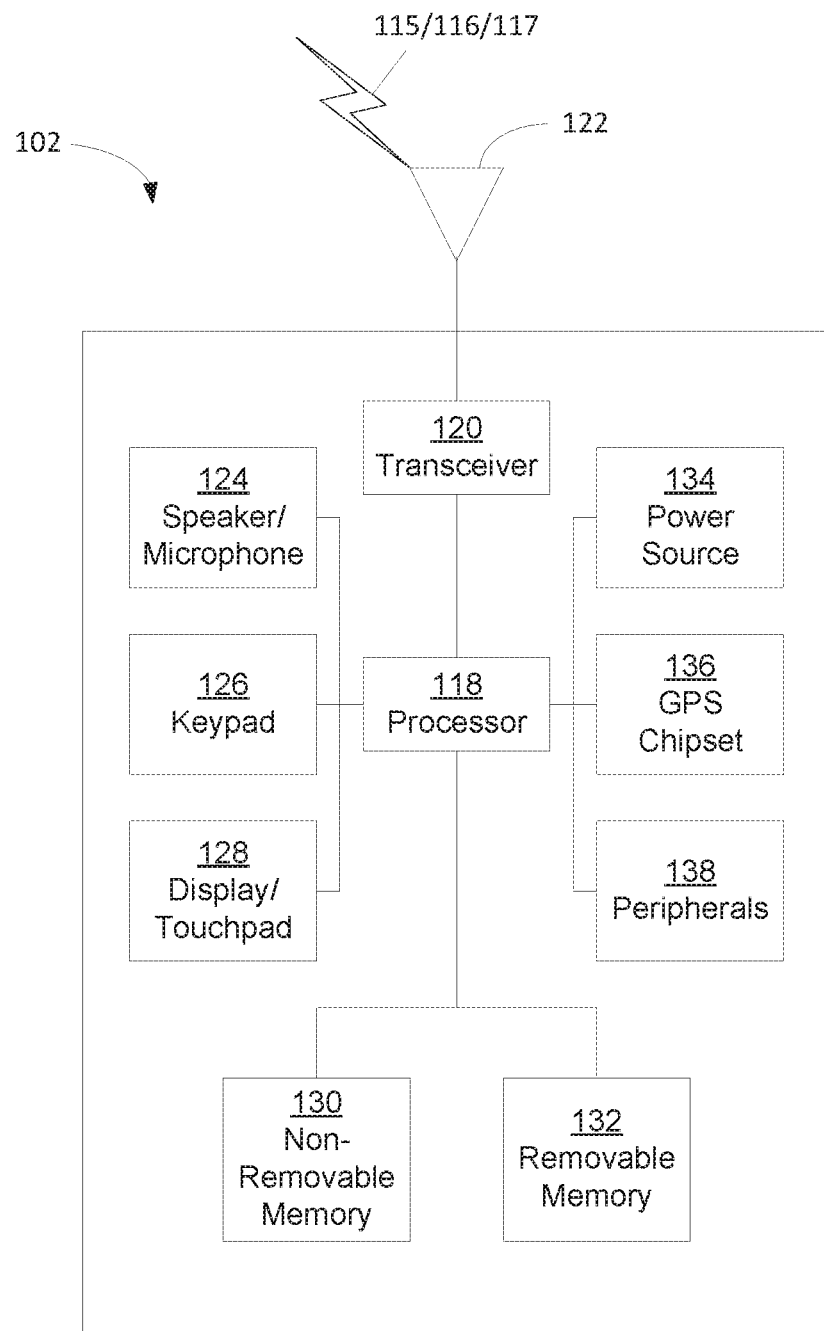
FIG. 11B is a system diagram of an example wireless transmit/receive unit (WTRU) that may be used within the communications system illustrated in FIG. 11A.

FIG. 11B is a system diagram of an example WTRU 102. As shown in FIG. 11B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements. Base stations 114a and 114b, and/or the nodes that base stations 114a and 114b, may represent, for example but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 11B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 11B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. In an example, the transmit/receive element 122 may be an antenna configured to transmit and/or receive RF signals. In an example, the transmit/receive element 122 may be an emitter/detector configured to transmit and/or receive IR, UV, or visible light signals, for example. In an example, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 11B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an example, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination technique.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 11C:
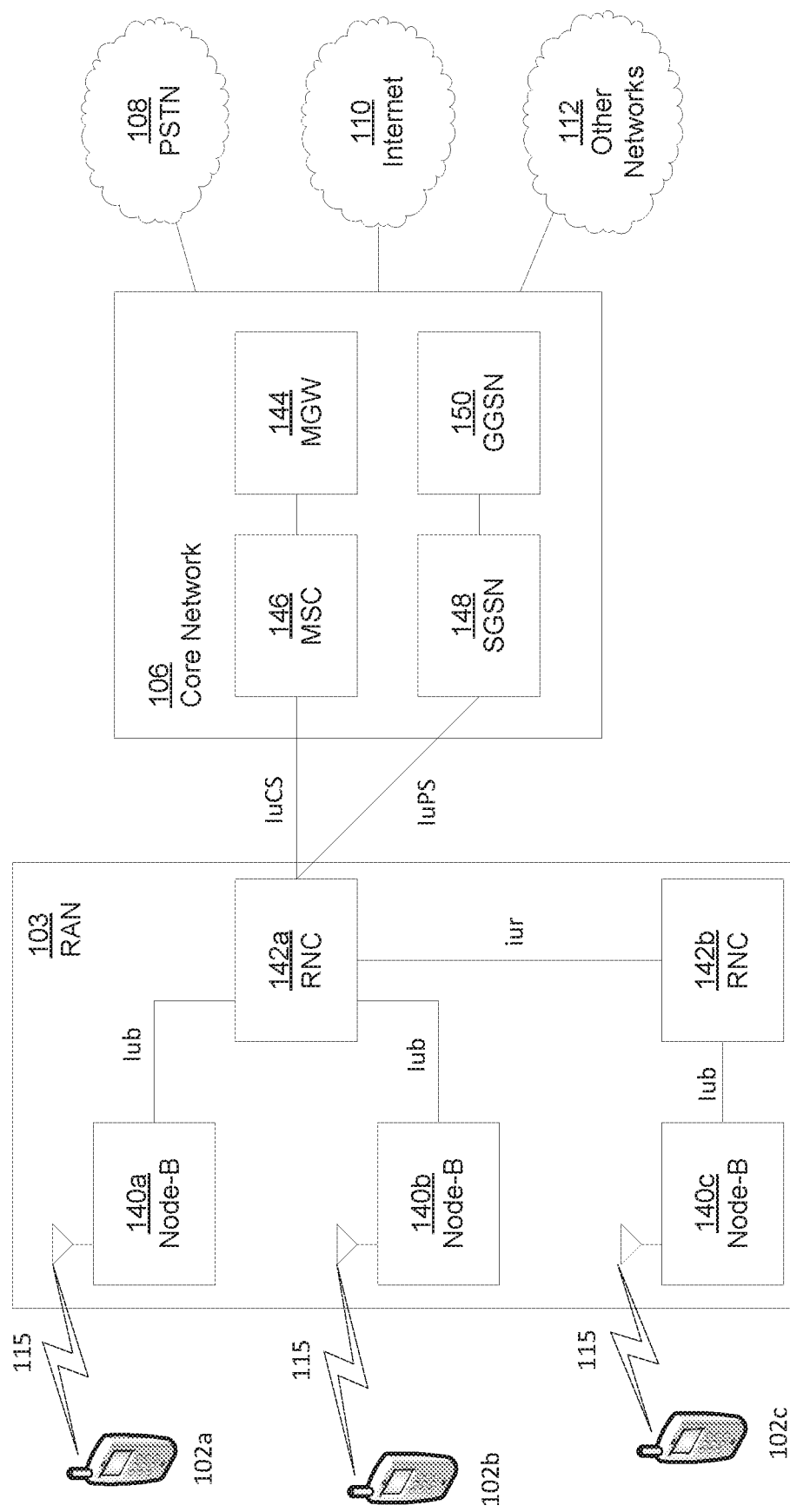
FIG. 11C is a system diagram of an example radio access network and an example core network that may be used within the communications system illustrated in FIG. 11A.

FIG. 11C is an example system diagram of the RAN 103 and the core network 106. As noted above, the RAN 103 may employ a UTRA radio technology to communicate with the WTRUs 102a, 102b, 102c over the air interface 115. The RAN 103 may also be in communication with the core network 106. As shown in FIG. 11C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs.

As shown in FIG. 11C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 11C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 11D:
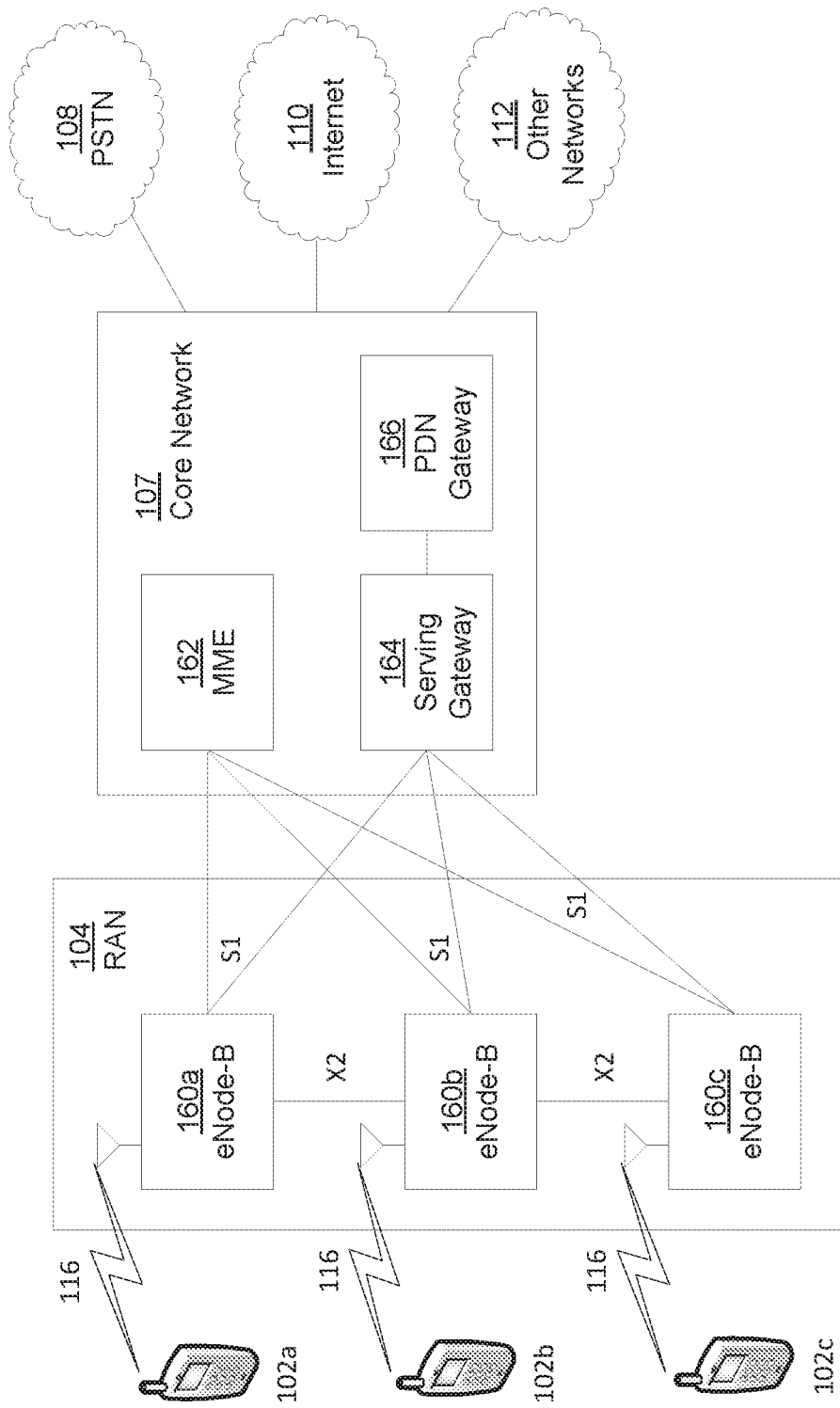
FIG. 11D is a system diagram of an example radio access network and an example core network that may be used within the communications system illustrated in FIG. 11A.

FIG. 11D is an example system diagram of the RAN 104 and the core network 107. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 11D, the eNode-Bs 160a, 160b, 160c may communicate with one another over an X2 interface.

The core network 107 shown in FIG. 11D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 11E:
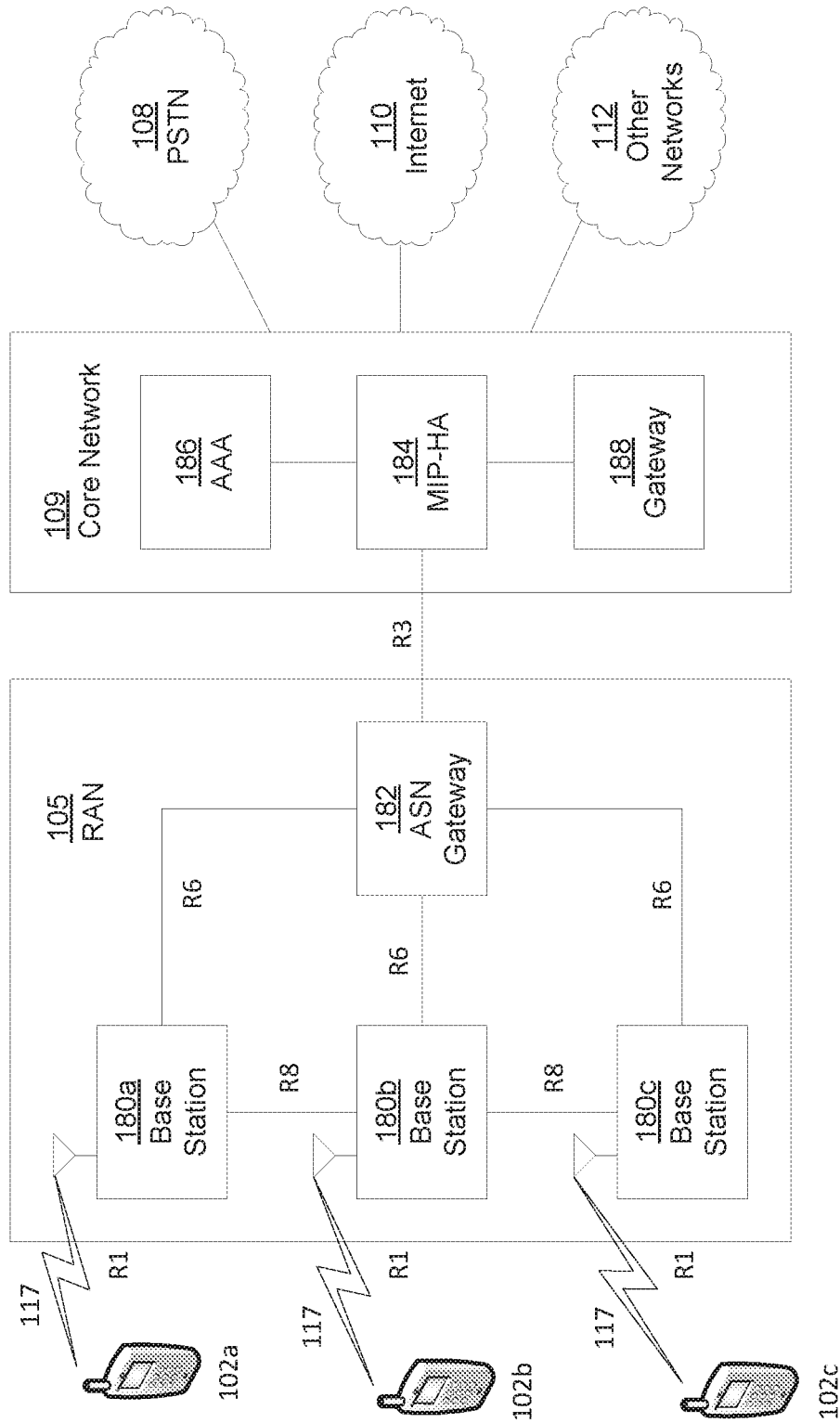
FIG. 11E is a system diagram of an example radio access network and an example core network that may be used within the communications system illustrated in FIG. 11A.

FIG. 11E is an example system diagram of the RAN 105 and the core network 109. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 11E, the RAN 105 may include base stations 180a, 180b, 180c, and an ASN gateway 182, though it will be appreciated that the RAN 105 may include any number of base stations and ASN gateways. The base stations 180a, 180b, 180c may each be associated with a particular cell (not shown) in the RAN 105 and may each include one or more transceivers for communicating with the WTRUs 102a, 102b, 102c over the air interface 117. In an example, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 11E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b. 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 11E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A server for managing a dynamic adaptive streaming over hypertext transfer protocol (HTTP) (DASH) session of a client, the server comprising:
    a memory; and
    a processor configured to:
        receive a request from the client for a media presentation description (MPD) file relating to media content comprising a plurality of media segments;
        retrieve the MPD file;
        determine a subset of the plurality of media segments that is stored within a cache of the server;
        determine an available bandwidth on a backhaul link;
        generate a dynamic MPD file, wherein content of the generated dynamic MPD file is based on the MPD file, the subset of the plurality of media segments, and the available bandwidth on the backhaul link; and
        transmit the generated dynamic MPD file to the client.

2. The server of claim 1, wherein the processor is further configured to retrieve the MPD file from the cache.

3. The server of claim 1, wherein the processor is further configured to retrieve the MPD file from an origin server.

4. The server of claim 1, wherein the processor is further configured to determine a refresh period based on a frequency in which the media content is stored within the cache.

5. The server of claim 1, wherein the processor is further configured to determine a refresh period based on at least one of a backhaul stability measurement or a frequency at which the client is requesting the media segments.

6. The server of claim 1, wherein the MPD file is a static MPD file.

7. The server of claim 1, wherein the processor is further configured to:
    receive additional media segments;
    store the additional media segments in the cache; and
    determine a refresh period;
    upon expiration of the refresh period:
        update the generated dynamic MPD file, based on the additional media segments being stored in the cache; and
        send the updated dynamic MPD file to the client.

8. The server of claim 1, wherein the processor is further configured to replace a previous version of the MPD file at the cache with a new version of the MPD file, based on the MPD file being received from an origin server.

9. The server of claim 1, wherein the cache is a cache of a middle box platform.

10. The server of claim 1, wherein the MPD file is received periodically.

11. A method for managing a dynamic adaptive streaming over hypertext transfer protocol (HTTP) (DASH) session of a client, the method comprising:
    receiving a request from the client for a media presentation description (MPD) file relating to media content comprising a plurality of media segments;
    retrieving the MPD file;
    determining a subset of the plurality of media segments that is stored within a cache of a server;
    determining an available bandwidth on a backhaul link;
    generating a dynamic MPD file, wherein content of the generated dynamic MPD file is based on the MPD file, the subset of the plurality of media segments, and the available bandwidth on the backhaul link; and
    transmitting the generated dynamic MPD file to the client.

12. The method of claim 11, wherein the MPD file is retrieved from the cache.

13. The method of claim 11, wherein the MPD file is retrieved from an origin server.

14. The method of claim 11, wherein a refresh period is determined based on a frequency in which the media content is stored within the cache.

15. The method of claim 11, wherein a refresh period is determined based on at least one of a backhaul stability measurement or a frequency at which the client is requesting the media segments.

16. The method of claim 11, wherein the MPD file is a static MPD file.

17. The method of claim 11, further comprising:
    receiving additional media segments;
    storing the additional media segments in the cache;
    determining a refresh period; and
    upon expiration of the refresh period:
        updating the generated dynamic MPD file, based on the additional media segments being stored in the cache; and
        sending the updated dynamic MPD file to the client.

18. The method of claim 11, wherein the cache is a cache of a middle box platform.

19. The method of claim 11, wherein the MPD file is received periodically.

20. The method of claim 11, further comprising replacing a previous version of the MPD file at the cache with a new version of the MPD file, based on the MPD file being received from an origin server.

* * * * *